(12) United States Patent
Okamoto et al.

(10) Patent No.: US 7,085,023 B2
(45) Date of Patent: Aug. 1, 2006

(54) IMAGE-READING APPARATUS

(75) Inventors: Tatsuki Okamoto, Tokyo (JP); Yukio Sato, Tokyo (JP); Hiroyuki Kawano, Tokyo (JP); Atsuhiro Sono, Tokyo (JP); Hironobu Arimoto, Tokyo (JP); Toshio Matsumoto, Tokyo (JP); Akira Ota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/958,410

(22) Filed: Oct. 6, 2004

(65) Prior Publication Data
US 2005/0088705 A1    Apr. 28, 2005

(30) Foreign Application Priority Data
Oct. 14, 2003   (JP)   .............................. 2003-353282
Mar. 4, 2004    (JP)   .............................. 2004-060125

(51) Int. Cl.
*H04N 1/40*  (2006.01)

(52) U.S. Cl. ...................... 358/471; 358/475; 358/483; 250/208.1; 250/216; 250/234

(58) Field of Classification Search ................ 358/474, 358/304, 471–498, 400; 250/208.1, 216–234
See application file for complete search history.

(56) References Cited

U.S. PATENT DOCUMENTS 5,586,212 A * 12/1996 McConica et al. .......... 385/146
6,014,231 A *  1/2000 Sawase et al. .............. 358/482
6,326,602 B1 * 12/2001 Tabata ..................... 250/208.1
6,538,243 B1    3/2003 Bohn et al.

FOREIGN PATENT DOCUMENTS

| JP | 11-55456 | 2/1999 |
| JP | 11-215301 | 8/1999 |
| JP | 2000-349957 | 12/2000 |
| JP | 2001-77975 | 3/2001 |
| JP | 2001-136341 | 5/2001 |

* cited by examiner

*Primary Examiner*—Thomas D. Lee
*Assistant Examiner*—Heather D. Gibbs
(74) *Attorney, Agent, or Firm*—Oblon, Spivak, McClelland, Maier & Neustadt, P.C.

(57) ABSTRACT

There is provided such a shape of a light-guiding body that can guide light emitted from a LED while reflecting such light under conditions which satisfy total reflection as much as possible within the light-guiding body, to thereby improve the light intensity on the surface of a document in the shorter axial direction (i.e., the sub-scanning direction), and also, the light-guiding body has such an optimized shape of a light-incoming face that makes it possible to control the angle of light fluxes in the longer axial direction (i.e., the main scanning direction) to thereby illuminate the surface of the document with light having an uniform intensity distribution. Further, a reflecting member is provided at a position opposite the light outgoing face of the light-guiding body so as to improve the efficiency of illuminating an objective image-reading region on the surface of the document.

15 Claims, 25 Drawing Sheets

ILLUMINATING LIGHT INTENSITY DISTRIBUTION
ON THE SURFACE OF A DOCUMENT
(IN THE LONGER AXIAL DIRECTION)

Fig.19
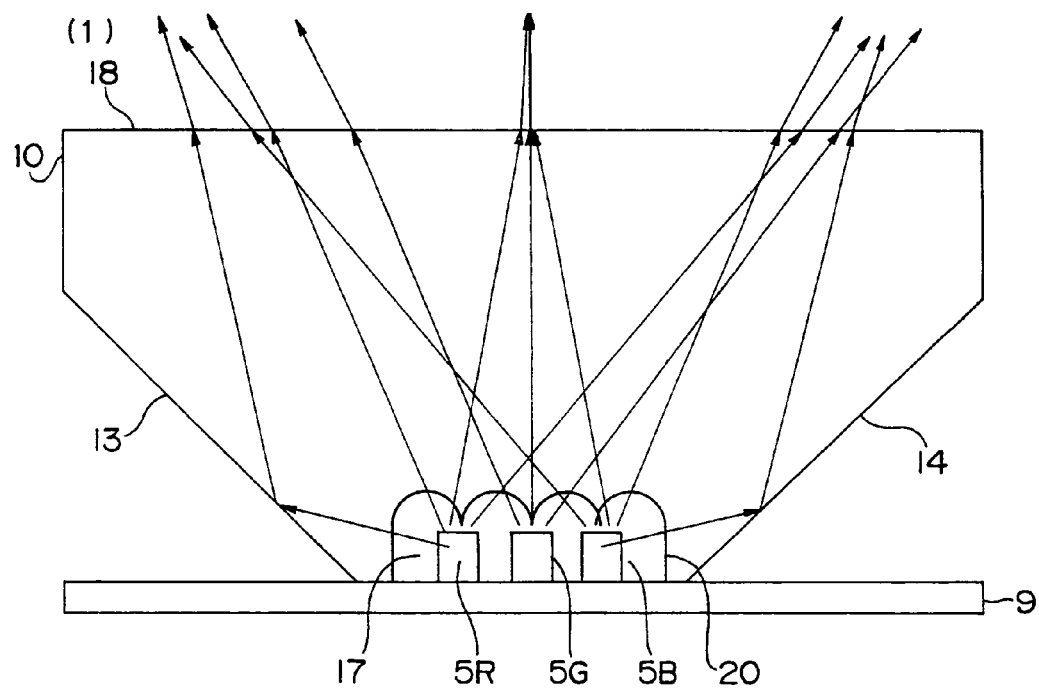
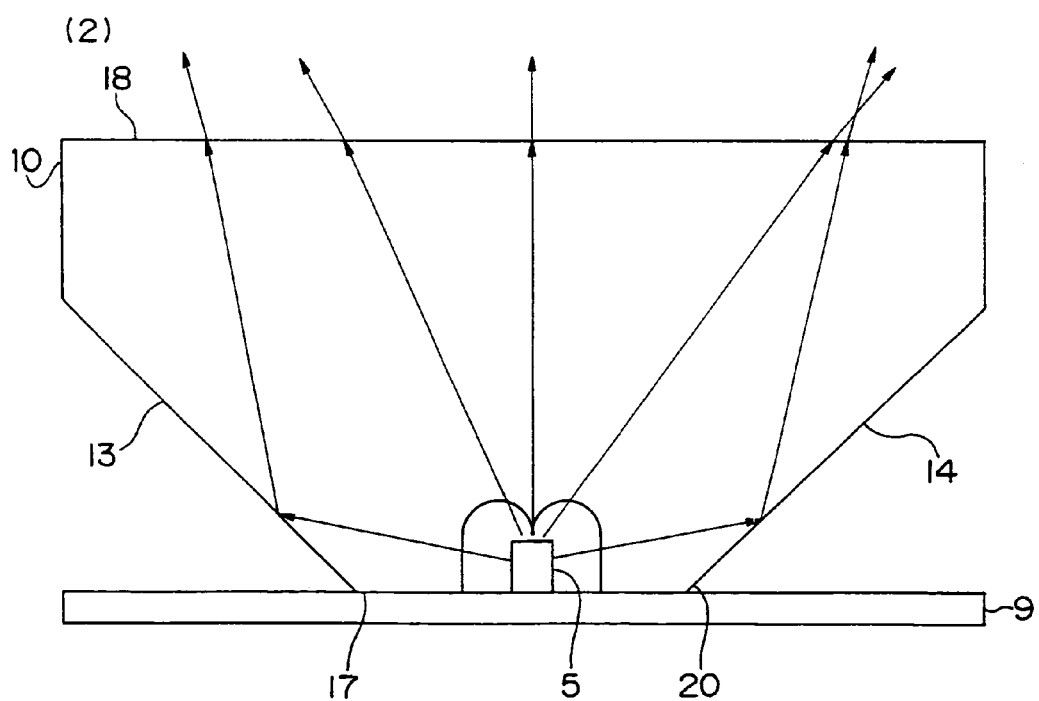

Fig.22
(1)
(a)
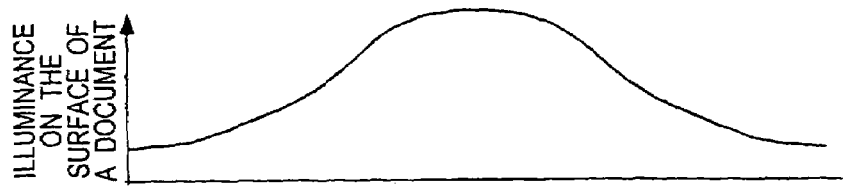
(b)
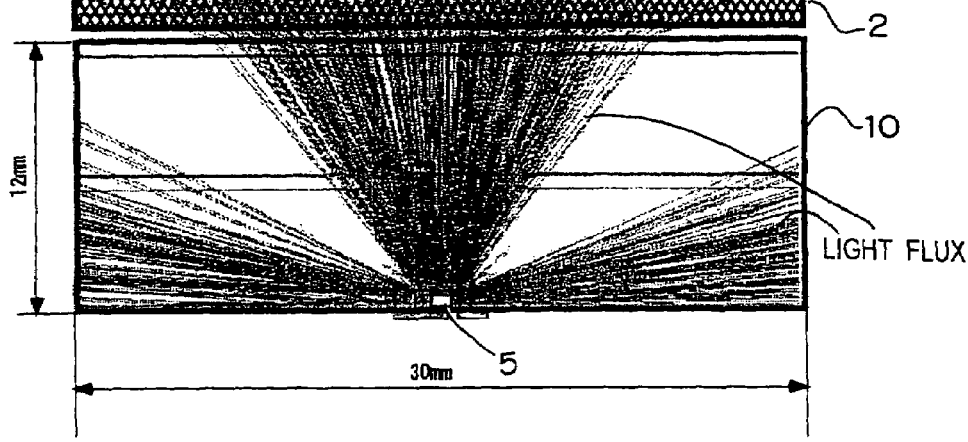
(2)
(a)
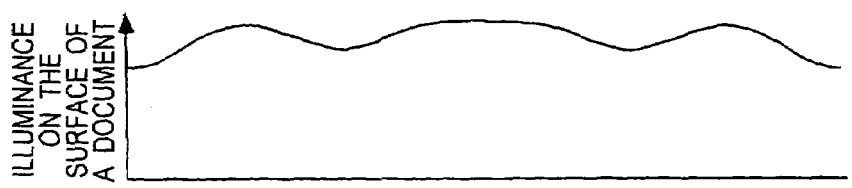
(b)
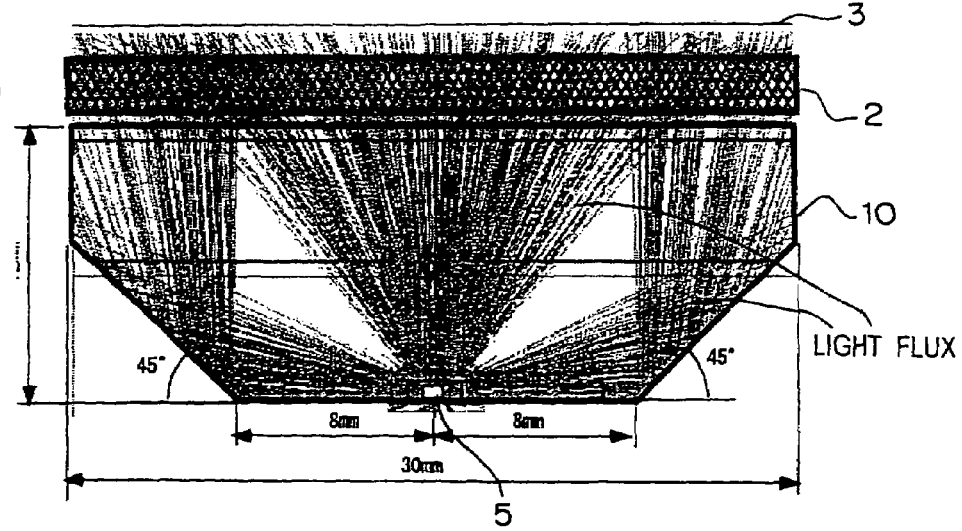

Fig.23
SECTIONAL VIEW TAKEN ALONG THE SUB-SCANNING DIRECTION
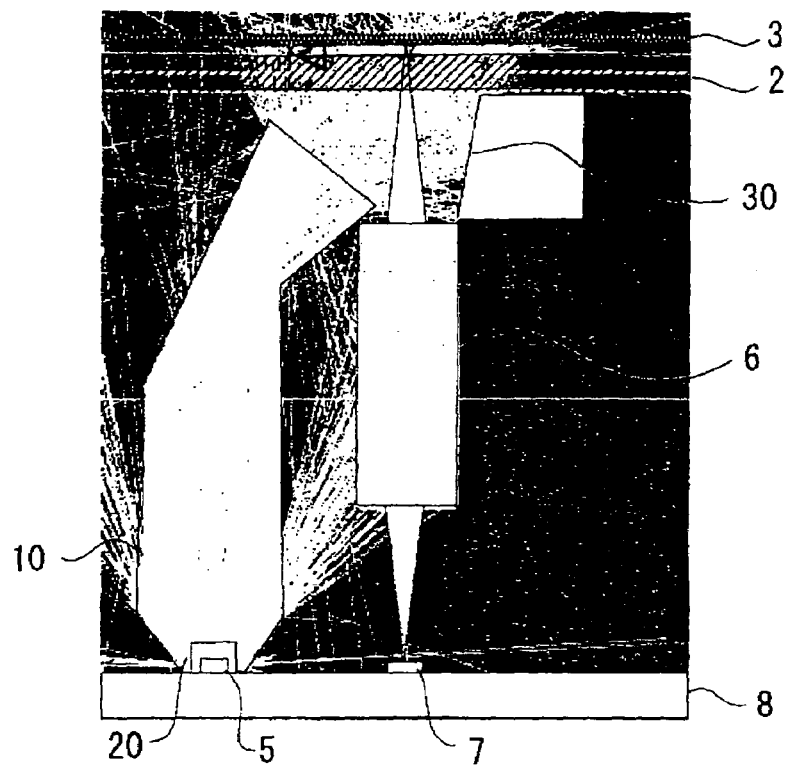
SECTIONAL VIEW TAKEN ALONG THE MAIN SCANNING DIRECTION
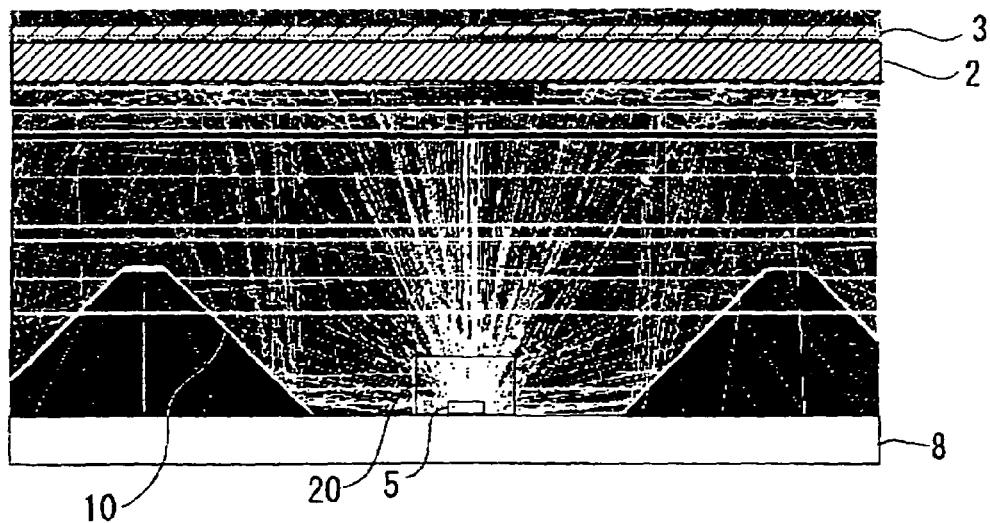

IMAGE-READING APPARATUS

CROSS-REFERENCE TO RELATED APPLICATION

The present application claims the benefit of patent applications No. 2003-353282 filed in Japan on Oct. 14, 2003 and No. 2004-60125 filed in Japan on Mar. 4, 2004, the subject matter of which is hereby incorporated herein by reference.

BACKGROUND OF THE INVENTION

1. Field of the Invention

The present invention relates to an image-reading apparatus, and particularly to an illuminating optical system thereof.

2. Description of the Related Art

In the image sensors of a facsimile, copying machine, scanner, etc. which read reflected light from documents to be read, light-emitting diodes (or LED) are widely used as illuminating optical systems.

The invention disclosed in JP-A-2001-136341 relates to the basic structure of a color-sequentially reading type contact image sensor, and the invention provides an image sensor which shows uniform output levels of red, green and blue and has a high sensitivity. The image-reading apparatus disclosed in JP-A-11-215301 is intended to improve the quality of read images as follows: a simple means is used to efficiently guide light emitted from a light source to an image-reading region, and thereby, the illuminance on the image-reading region is enhanced to improve the quality of the read image. However, this apparatus has a defect in that, since the surface of the hollow light-guiding body is colored white, most of light is diffused, and therefore, it is difficult to efficiently guide light to the surface of a document.

The invention disclosed in JP-A-11-55456 is intended to reduce the production cost of the image-reading apparatus by facilitating the assembly of predetermined components such as a light source, etc. and the electric wiring, which compose the image-reading apparatus, without any disadvantage in the image-reading functions. However, this image-reading apparatus has a problem in that the number of LEDs to be increased in order to enhance the intensity of illumination is limited, because light from LEDs are led to the light-guiding body, only from the side wall or the center of the base of the light-guiding body: i.e., the opening of the light-guiding body for introducing LED is small.

The invention disclosed in JP-A-2000-349957 provides a color image sensor capable of efficiently and uniformly guiding light from a light source to a reading region, and an image-reading apparatus comprising the same. However, the angle of outgoing light becomes larger since light is guided by a curved prism, and thus, the illuminated area of the surface of a document becomes larger. As a result, the efficiency of utilizing illuminating light is poor in case of linear reading.

The invention disclosed in JP-A-2001-77975 makes it possible to efficiently and correctly guide light emitted from the light source of an image-reading apparatus, to a desired linear objective region to be read. However, this apparatus has problems in that the shapes of lenses arrayed are complicated, and also that high accuracy is demanded for production of the apparatus.

The illuminating optical systems of the existing image-reading apparatuses which comprise the inventions disclosed in the above publications have problems in that the illumination angles are polarized because light fluxes directly illuminate the surfaces of documents from the light-guiding means, and therefore that the wrinkles on the surfaces of the documents cast their shadows, in other words, undesirably, the reading optical systems read such shadows.

SUMMARY OF THE INVENTION

The present invention relates to an image-reading apparatus, and an object of the invention is to provide such a shape of a light-guiding body that can guide light emitted from a LED while reflecting such light under conditions which satisfy total reflection as much as possible within the light-guiding body, to thereby improve the light intensity on the surface of a document in the shorter axial direction (i.e., the sub-scanning direction), and also that has such an optimized shape of a light-incoming face as to make it possible to control the angle of light fluxes in the longer axial direction (i.e., the main scanning direction) to thereby illuminate the surface of the document with light having an uniform intensity distribution. Another object of the present invention is to prevent reading of a wrinkle on the surface of the document by providing a reflecting member.

The present invention is developed in order to achieve the above objects. An image-reading apparatus according to the present invention comprises at least one light source which illuminates the surface of a document with light; a light-guiding means which has a light incoming face and a light outgoing face and which allows light emitted from the light source to travel in the transparent material of the light-guiding means and guides the light to a linear objective reading region; an optical system which collects light reflected on the surface of the document; and a reading sensor which is disposed on the image-forming member of the optical system to read the image of the document; and this image-reading apparatus is characterized in that the above light-guiding means has, at its top face, the light outgoing face in the shape of a substantially rectangular parallelopiped which is longer in the longer axial direction of the linear objective reading region, and has, at its base, a light source-accommodating section having the light source disposed therein, the wall of the light source-accommodating section serving as the above light incoming face; that the side walls of the above light-guiding means serve as a first face and a second face which are formed through the thickness in the shorter axial direction of the light-guiding means and which are in parallel to the longer axial direction of the light-guiding means, and other side walls of the light-guiding means serve as a seventh face and an eighth face which are formed through the thickness in the longer axial direction of the light-guiding means and which are in parallel to the shorter axial direction of the light-guiding means; that, in the shorter axial direction of the linear objective reading region of the document, light fluxes which are emitted from the light source and are allowed to pass through the light source-accommodating section and income to the light incoming face of the light-guiding means are reflected on the first face and the second face so as to be guided to the light outgoing face and to the linear objective reading region; and that a reflecting face which reflects a part of the light fluxes outgoing from the light outgoing face of the light-guiding means is disposed through the optical system which collects light reflected on the surface of the document, so as to guide the part of the light fluxes to the linear objective reading region.

The image-reading apparatus according to the present invention makes it possible to efficiently guide light emitted from a light source to an objective reading region. In addition, since illuminating light is uniformly distributed on the surface of a document, an image of the document can be correctly read. Further, it becomes possible to prevent the reading of wrinkles on the document by providing a reflecting member.

BRIEF DESCRIPTION OF THE DRAWINGS

FIG. 19 is a sectional view of a light-guiding means to be used in an image-reading apparatus according to the thirteenth embodiment of the present invention, taken along the longer axial direction (i.e., the main scanning direction);

FIG. 22 consists of FIGS. 22(1)(a), 22(1)(b), 22(2)(a) and 22(2)(b), wherein FIG. 22(1)(b) shows an example of simulation of traces of light obtained by a conventional light-guiding means, and FIG. 22(1)(a) is a graph of the illuminance on the surface of a document which corresponds to the sectional view of FIG. 22(1)(b); and FIG. 22(2)(b) shows an example of simulation of traces of light obtained by the light-guiding means according to the first embodiment, and FIG. 22(2)(a) is a graph of the illuminance on the surface of the document which corresponds to the sectional view of FIG. 22(2)(b);

FIG. 23 shows an example of simulation of traces of light obtained by the light-guiding means according to the fifteenth embodiment;

DETAILED DESCRIPTION OF THE PREFERRED EMBODIMENTS

Embodiment 1

Figure 1:
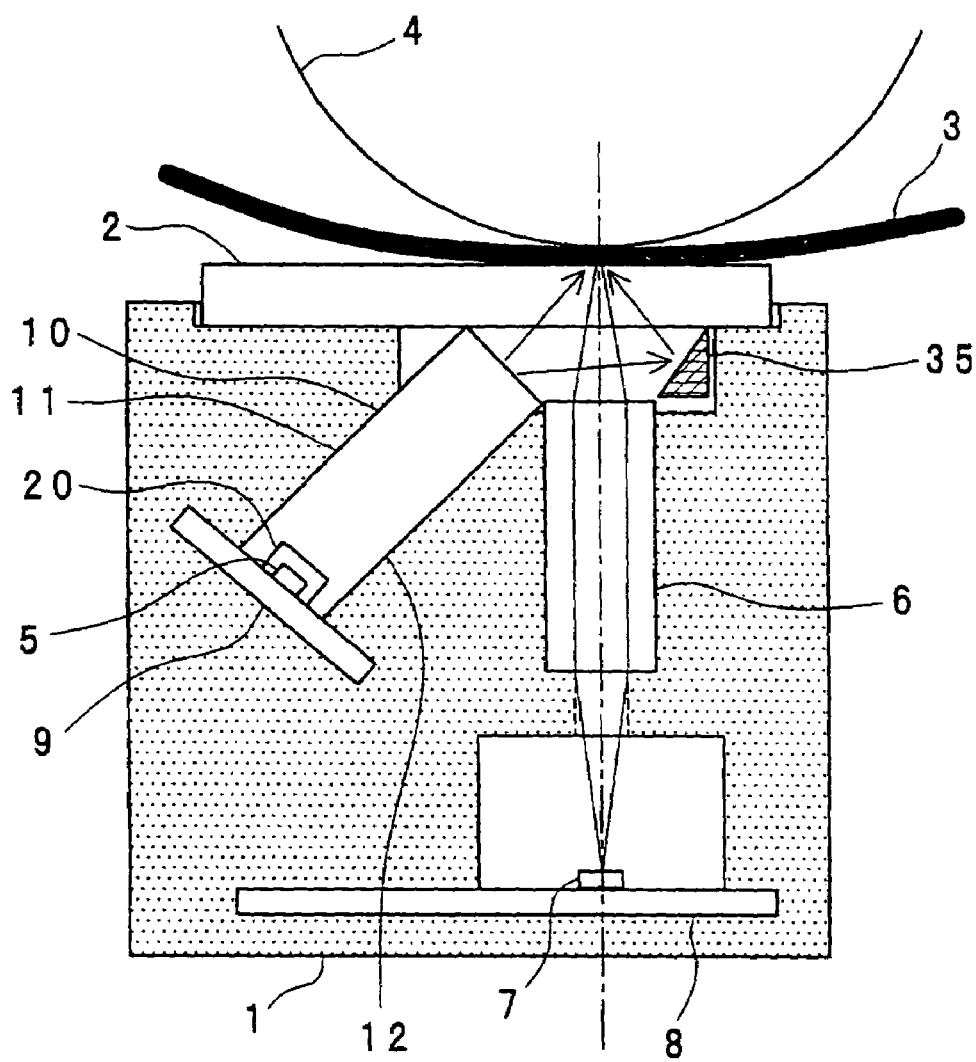
FIG. 1 is a sectional view of an image-reading apparatus according to the first embodiment of the present invention, taken along the shorter axial direction (i.e., the sub-scanning direction).
Figure 2:
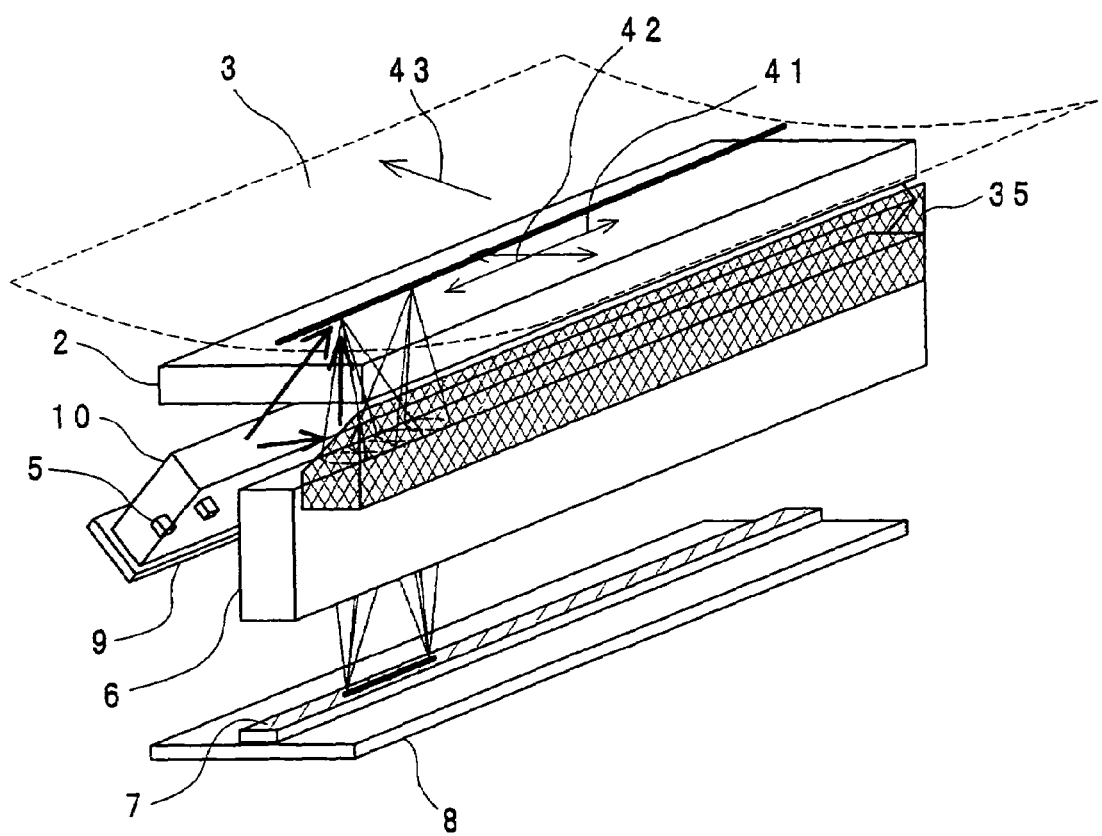
FIG. 2 is a perspective view of a part of the image-reading apparatus according to the first embodiment of the present invention.

FIG. 1 is a sectional view of an image-reading apparatus according to the first embodiment of the present invention, taken along the shorter axial direction (the sub-scanning direction) thereof. FIG. 2 is a perspective view of a part of the image-reading apparatus according to the first embodiment of the present invention. In this image-reading apparatus, the document (3) is fed by the platen (4) while being held between the glass plate (2) on the casing (1) and the platen (4). The casing (1) includes an illuminating optical system and a reading optical system under the glass plate (2). The illuminating optical system comprises a substrate (9) having a light source mounted thereon and a light-guiding means (10). The light-guiding means (10) guides light emitted from the light source (5) such as LED mounted on substrate (9), and illuminates the document (3) to be read, with the guided light through the glass plate (2). The position for reading the document (3) is on a line extending along the main scanning direction. The reading optical system comprises a rod lens array (6) and a substrate (8) having a line sensor IC (7) mounted thereon. The light read from the document (3) is transferred to the line sensor IC (7) as a non-reverse image in the ratio 1:1 by the rod lens array (6), and the non-reverse image is converted into an electric signal by the line sensor IC (7). The document (3) is fed by the platen (4), and the data of a whole of the document are finally converted into electric signals.

In the above image-reading apparatus, the illuminating optical system is appropriately adjusted so that light from the light source (5) can properly reach the document (3), and the reading optical system is appropriately adjusted so that the reflected light from the document (3) can properly reach the line sensor IC (7).

Figure 6:
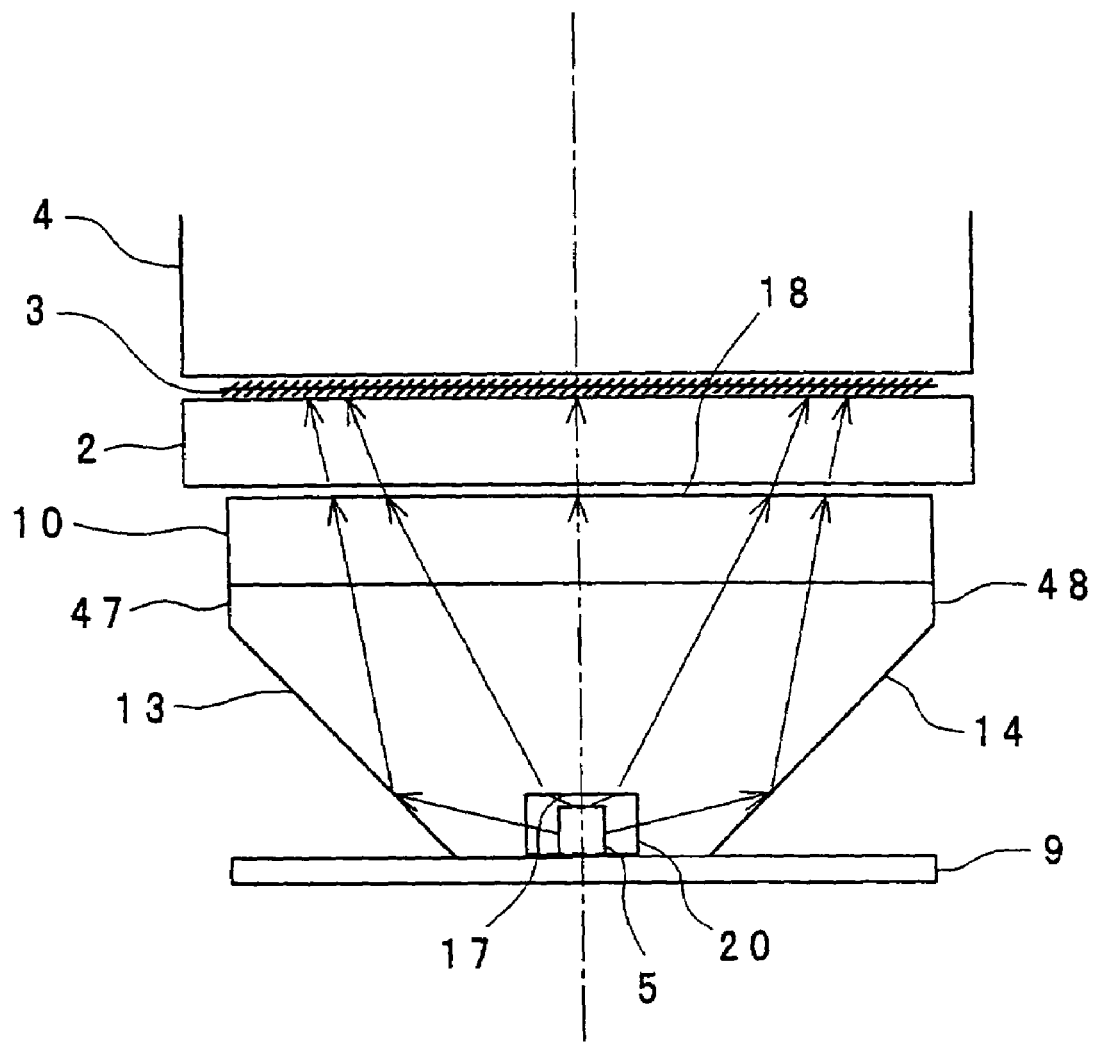
FIG. 6 is a sectional view of a light-guiding means to be used in an image-reading apparatus according to the fourth embodiment of the present invention, taken along the longer axial direction (i.e., the main scanning direction).
Figure 7:
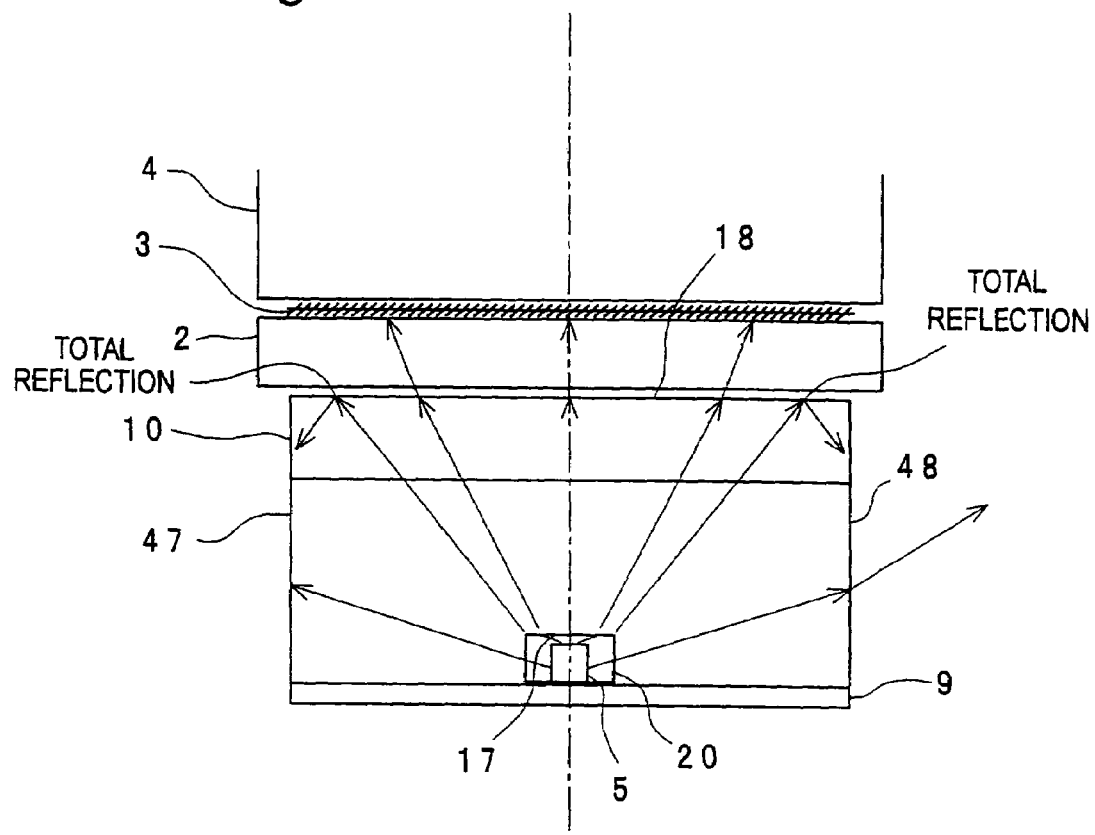
FIG. 7 is a sectional view of a light-guiding means as a comparative example relative to the fourth embodiment.

The light-guiding means (10) has a first face (11) and a second face (12) at its front and rear sides along the shorter axial direction, and has a seventh face (47) and an eighth face (48) at its front and rear sides along the longer axial direction (see FIGS. 6 and 7). The light-guiding means (10) has a light source-accommodating section (20) at its base, and a light source (5) is disposed in the light source-accommodating section (20). The wall of the light source-accommodating section serves as a light incoming face (17) to the light-guiding means (10) (see FIG. 6).

The light fluxes from the light-guiding means (10) which directly illuminate the surface of the document (hereinafter referred to as direct illuminating light fluxes) have an uniform illumination angle distribution. When the document is illuminated with such light fluxes alone, a shadow is cast from a wrinkle on the document if it has any, and the reading optical system reads such a wrinkle on the document.

To overcome this problem, the image-reading apparatus according to the first embodiment of the present invention is provided with a reflecting member (35) which is disposed at the opposite side through the reading optical system. The reflecting member (35) reflects a part of light fluxes outgoing from the light-guiding body (hereinafter referred to as reflected illuminating light fluxes) and guides such light fluxes to the surface of the document. By doing so, the reflected light fluxes illuminate the shadow portion on the document, which occurs when only the light fluxes emitted from the light-guiding means (10) directly illuminate the surface of the document. Thus, it becomes hard for the reading optical system to read the wrinkle on the surface of the document.

Figure 3:
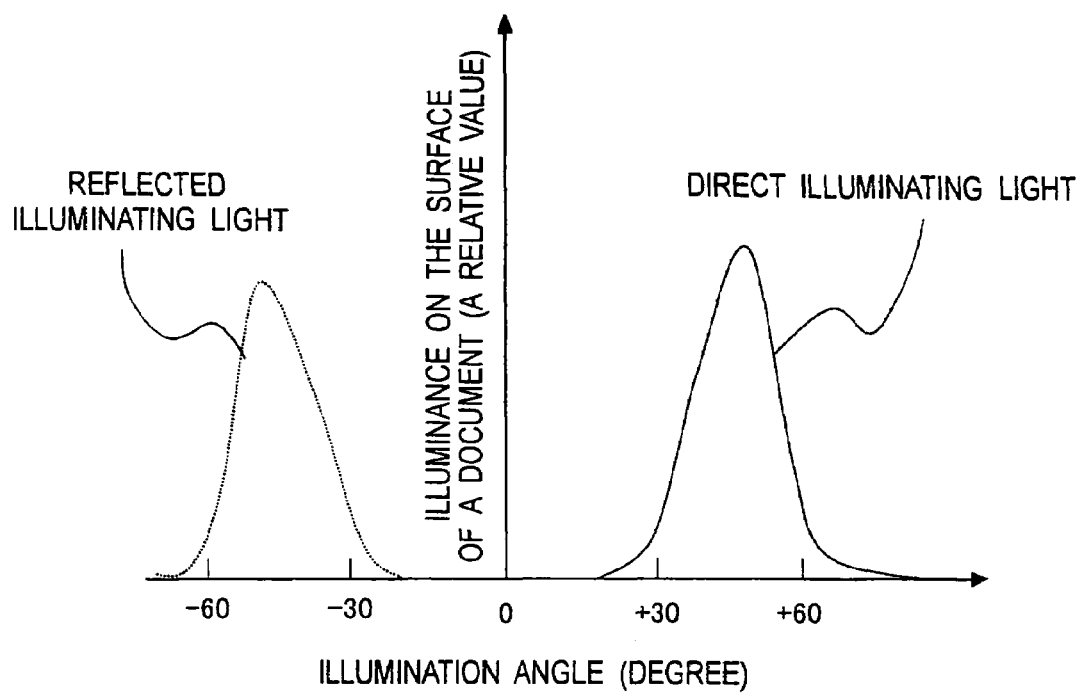
FIG. 3 shows an example of simulation of the angle distribution of light which illuminats the surface of a document, when the image-reading apparatus according to the first embodiment of the present invention is used.

FIG. 3 shows an example of simulation of the angle distribution of light which illuminates the surface of the document. The light fluxes which outgo from the light-guiding body and which directly illuminate the surface of the document have incident angles of +30 to +60°. On the other hand, the light fluxes which are reflected on the reflecting member (35) to illuminate the surface of the document have incident angles of −30 to −60°. Therefore, both the incident angles to the surface of the document are substantially symmetric with each other, so that the occurrence of shadows due to some wrinkles on the surface of the document becomes rare.

Embodiment 2

Figure 4:
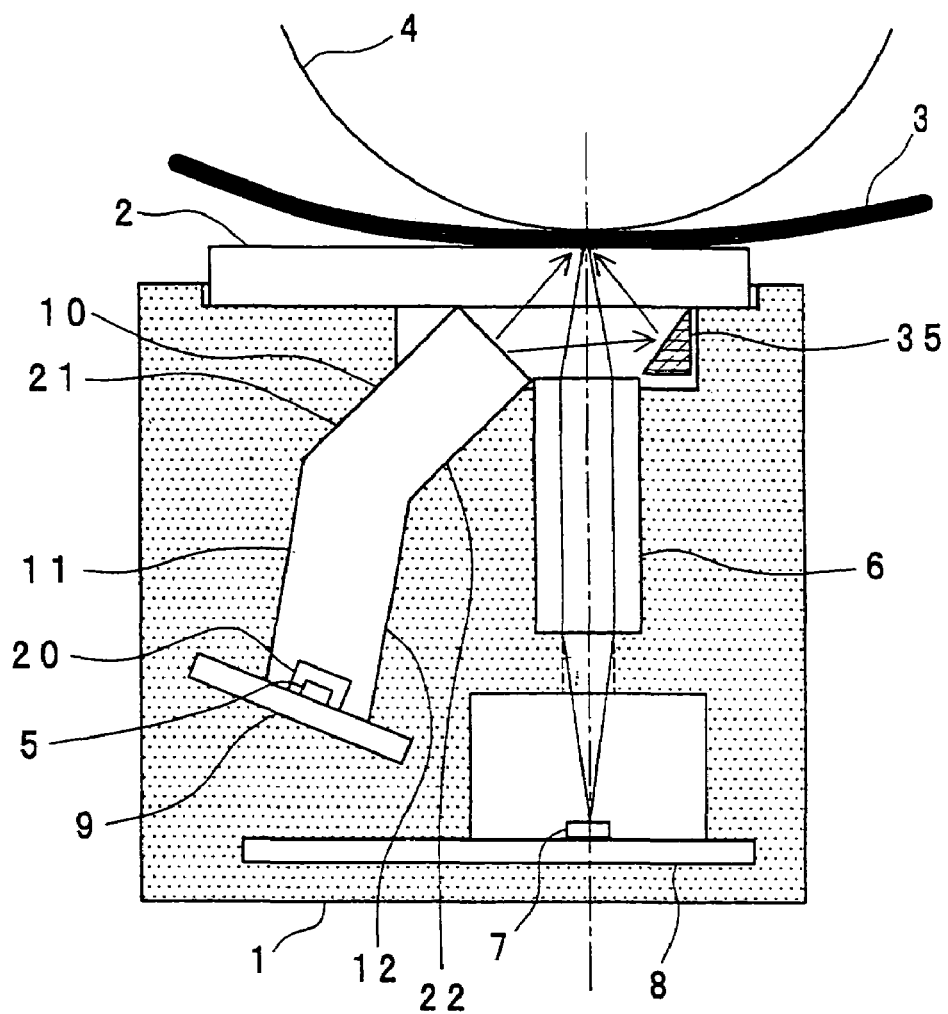
FIG. 4 is a sectional view of an image-reading apparatus according to the second embodiment of the present invention, taken along the shorter axial direction (i.e., the sub-scanning direction).

FIG. 4 shows a sectional view of an image-reading apparatus according to the second embodiment of the present invention, taken along the shorter axial direction thereof (i.e., the sub-scanning direction). The second embodiment shown in FIG. 4 is practically the same one as the first embodiment shown in FIG. 1. Therefore, the description of the same parts is omitted by denoting them with the like reference numerals.

In the image-reading apparatus according to the second embodiment, the light-guiding means (10) has a ninth face (21) and a tenth face (22) between the first face (11) and the light outgoing face thereof and between the second face (12) and the light outgoing face thereof, respectively. The ninth face (21) and the tenth face (22) form predetermined angles with the first face (11) and the second face (12), respectively.

In addition, the substrate (9) having a light source mounted thereon is not orthogonal to the first face (11) and the second face (12), unlike the first embodiment, and the substrate (9) forms an angle other than 90° with each of the first face (11) and the second face (12).

Under the above conditions, it becomes possible to decrease the difference in illuminance between the direct illuminating light fluxes and the reflected illuminating light fluxes, as compared with the first embodiment. Accordingly, the occurrence of shadows due to some wrinkles on the surface of the document becomes rarer.

Embodiment 3

Figure 5:
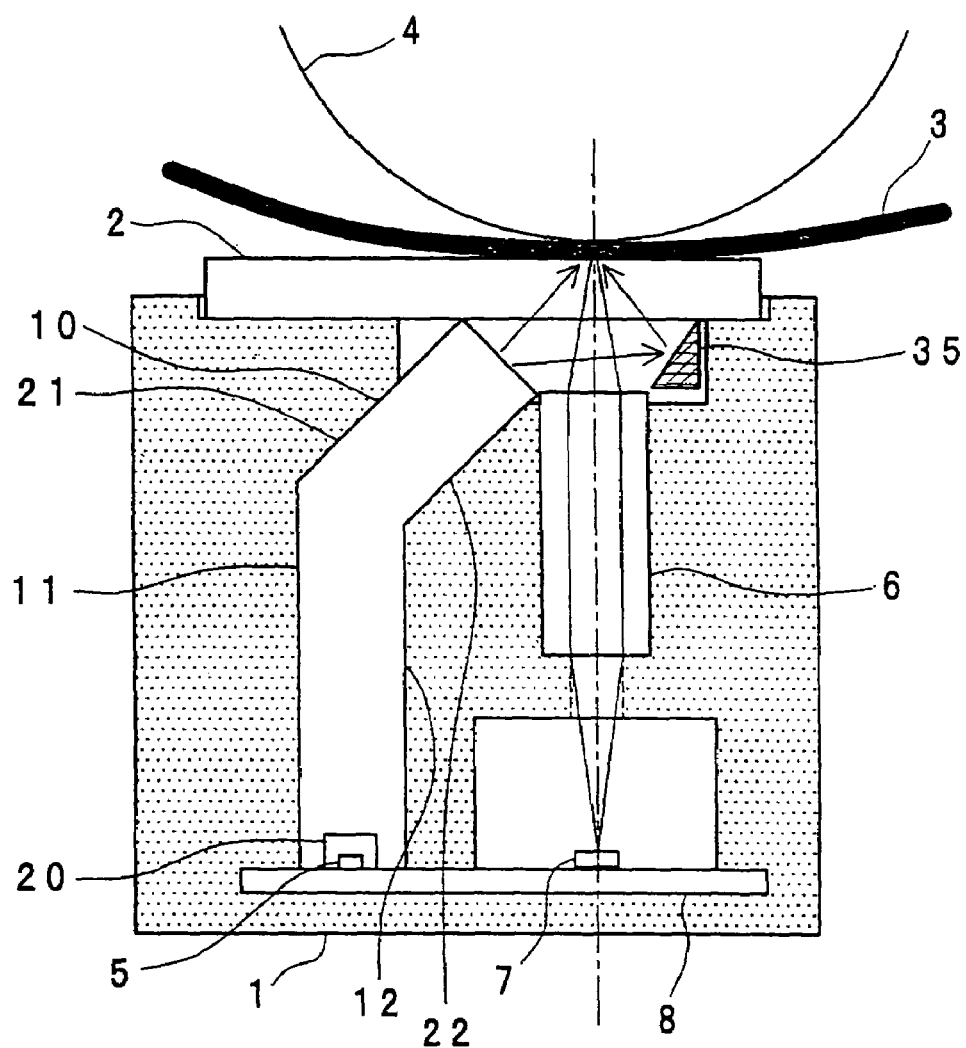
FIG. 5 is a sectional view of an image-reading apparatus according to the third embodiment of the present invention, taken along the shorter axial direction (i.e., the sub-scanning direction).

FIG. 5 shows a sectional view of an image-reading apparatus according to the third embodiment of the present invention, taken along the shorter axial direction thereof (i.e., the sub-scanning direction). The third embodiment shown in FIG. 5 is practically the same one as the first embodiment shown in FIG. 1 or the second embodiment shown in FIG. 4. Therefore, the description of the same parts is omitted by denoting them with the like reference numerals.

In the image-reading apparatus according to the third embodiment, the light source (5) is disposed on the same substrate together with the line sensor IC (7), by adjusting the lengths and angles of the first face (11), the second face (12), the ninth face (21) and the tenth face (22) of the light-guiding means (10). In other words, the substrate having the light source mounted thereon and the substrate (8) having the sensor mounted thereon are formed integrally with each other.

By doing so, the number of the components which compose the image-reading apparatus can be decreased, and the assembly of the apparatus can be facilitated.

Embodiment 4

FIG. 6 shows a sectional view of the light-guiding means (10) of an image-reading apparatus according to the fourth embodiment of the present invention, taken along the longer axial direction thereof (i.e., the main scanning direction). On the other hand, FIG. 7 shows a sectional view of a light-guiding means (10) as a comparative example, taken along the longer axial direction thereof.

Figure 8:
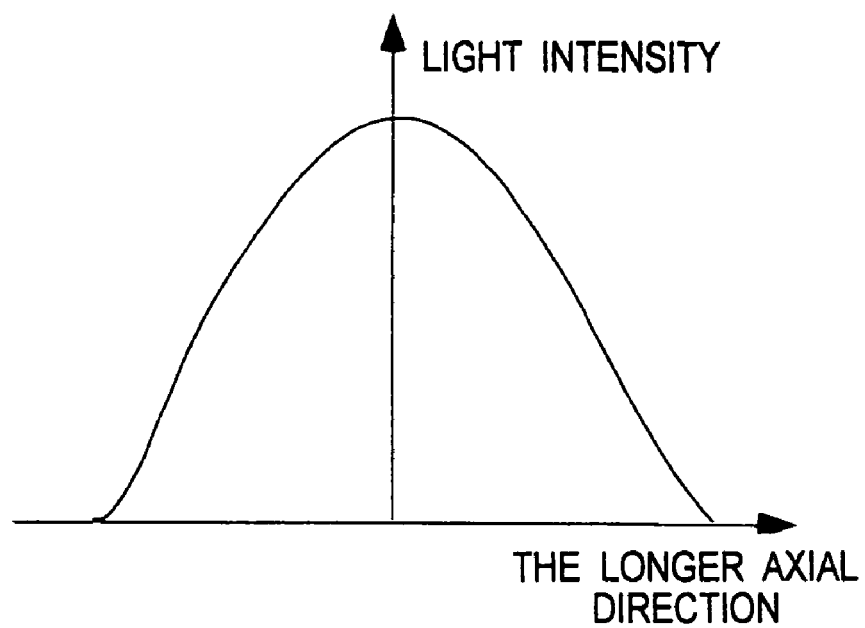
FIG. 8 shows an example of an illuminance distribution on the surface of a document in the longer axial direction, obtained by a conventional image-reading apparatus.

When the shape of the light-guiding means (10) is such a simple rectangular parallelopiped as shown in FIG. 7, the incident angles of a part of light fluxes which reach the light outgoing face (18) of the light-guiding means exceed the condition of total reflection. Accordingly, such a part of light fluxes can not be taken out from the light outgoing face (18) of the light-guiding means (10). Then, the illuminance distribution on the surface of the document (3) in the longer axial direction is higher at the center of the document, and lower at the peripheral portion of the document, as shown in FIG. 8.

Figure 9:
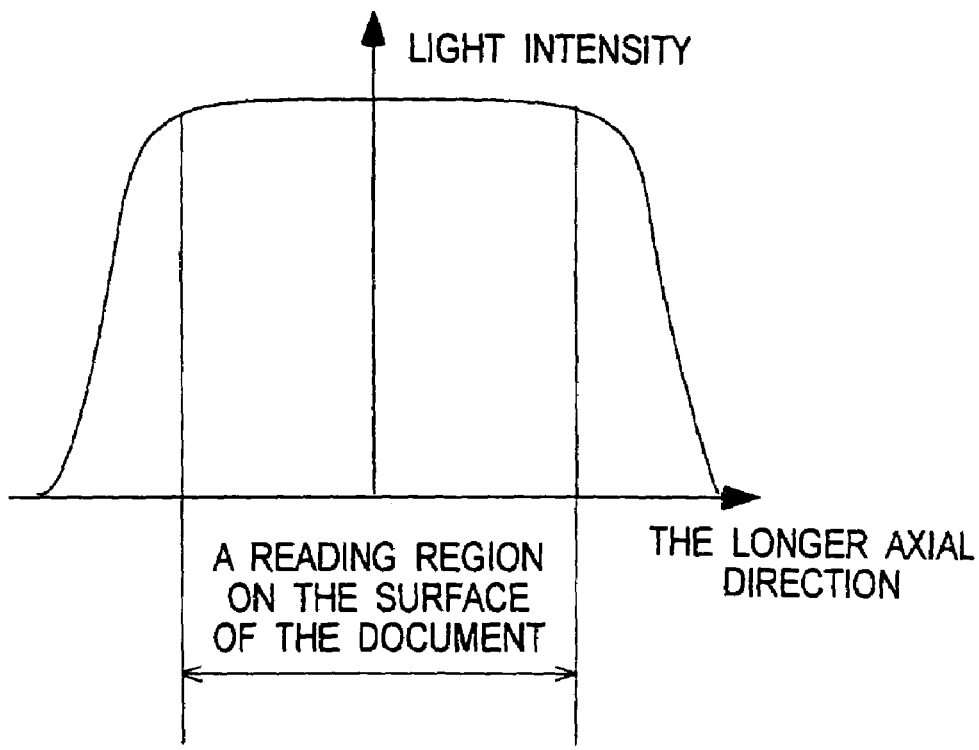
FIG. 9 shows an example of an illuminance distribution on the surface of a document in the longer axial direction, obtained by the image-reading apparatus according to the fourth embodiment.

To overcome this problem, the light-guiding means (10) shown in FIG. 6 has oblique cut faces as a third face (13) and a fourth face (14) which are formed at the lower end portion of the rectangular parallelopiped body. The third face (13) and the fourth face (14) are so formed as to spread and extend outwardly (i.e., toward the seventh face (47) and the eighth face (48)) from at and around the light source-accommodating section (20) on the base of the light-guiding means (10). The third face (13) and the fourth face (14) reflect light fluxes with such angles that meet the total reflection conditions, if the light fluxes directly reach the light outgoing face (18), and enter such light fluxes into the light outgoing face (18) under such conditions that do not cause total reflection. Thus, the third face (13) and the fourth face (14) effectively guide the light fluxes to the surface of the document (3). An uniform illuminance intensity distribution as shown in FIG. 9 can be obtained by adjusting the inclining angles of the third face (13) and the fourth face (14) of the light-guiding means (10) and the interval therebetween, in accordance with the height of the light-guiding means (10).

In this connection, when the third face (13) and the fourth face (14) of the light-guiding means (10) are so adjusted as to reflect light fluxes under total reflection conditions, there is no need to provide reflective coatings on the third face (13) and the fourth face (14).

It is known from the repetitive tests that an uniform illuminance distribution along the main scanning direction can be easily obtained on the line sensor (IC) when the width of the block of the light-guiding means (10) shown in FIG. 6 in its longer axial direction is maximum four times, preferably maximum three times larger than the distance between the line sensor IC (7) and the surface of the document. For example, when the distance between the line sensor IC (7) and the surface of the document is supposed to be 10 mm, the width of the block of the light-guiding means (10) in the longer axial direction is from 30 mm to 40 mm. Under this condition, desired uniformity of illuminance can be obtained by using a minimal number of blocks (i.e., a minimal number of LEDs).

FIG. 22(1)(b) shows an example of simulation of the traces of light in the conventional light-guiding means (10) shown in FIG. 7, and FIG. 22(1)(a) shows a schematic graph of the illuminance on the surface of the document, which corresponds to the sectional view of the light-guiding means shown in FIG. 22(1)(b). On the other hand, FIG. 22(2)(b) shows an example of simulation of the traces of light in the light-guiding means (10) according to the fourth embodiment shown in FIG. 6, and FIG. 22(2)(a) shows a schematic graph of the illuminance on the surface of the document, which corresponds to the sectional view of the light-guiding means shown in FIG. 22(2)(b). As is apparent from the graph shown in FIG. 22(2)(a), substantially uniform illuminance distribution can be obtained in the longer axial direction.

In this regard, the light-guiding means is made of a transparent material relative to illuminating light. In view of convenience for production, transparent resin materials such as polycarbonate and acryl are preferred. As the light source (5), the use of a LED of white light or LEDs of three primary color lights is considered. It is possible to apply this embodiment to a system in which a color filter is applied to the surface of a line sensor. In case of the use of LEDs of three primary color lights as the light source, it is possible to apply this embodiment to the field sequential system for lighting LEDs of R, G and B in order.

The use of the light-guiding means of the fourth embodiment makes it possible to efficiently guide light from the light source to an objective region to be read, and further makes it possible to uniform the illumination so that the image of the document can be correctly read.

Embodiment 4

Figure 10:
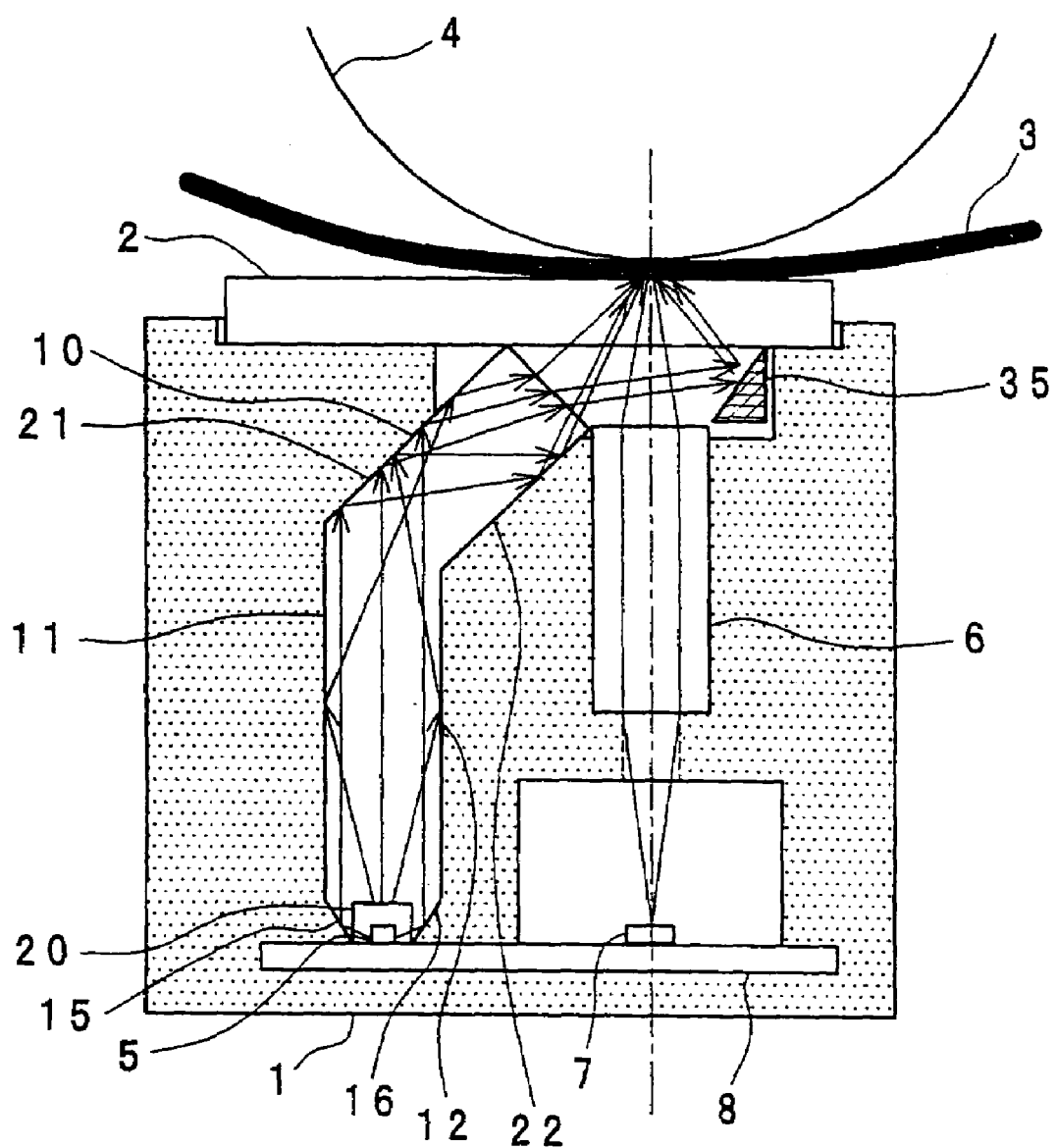
FIG. 10 is a sectional view of a light-guiding means to be used in an image-reading apparatus according to the fifth embodiment of the present invention, taken along the shorter axial direction (i.e., the sub-scanning direction).
Figure 11:
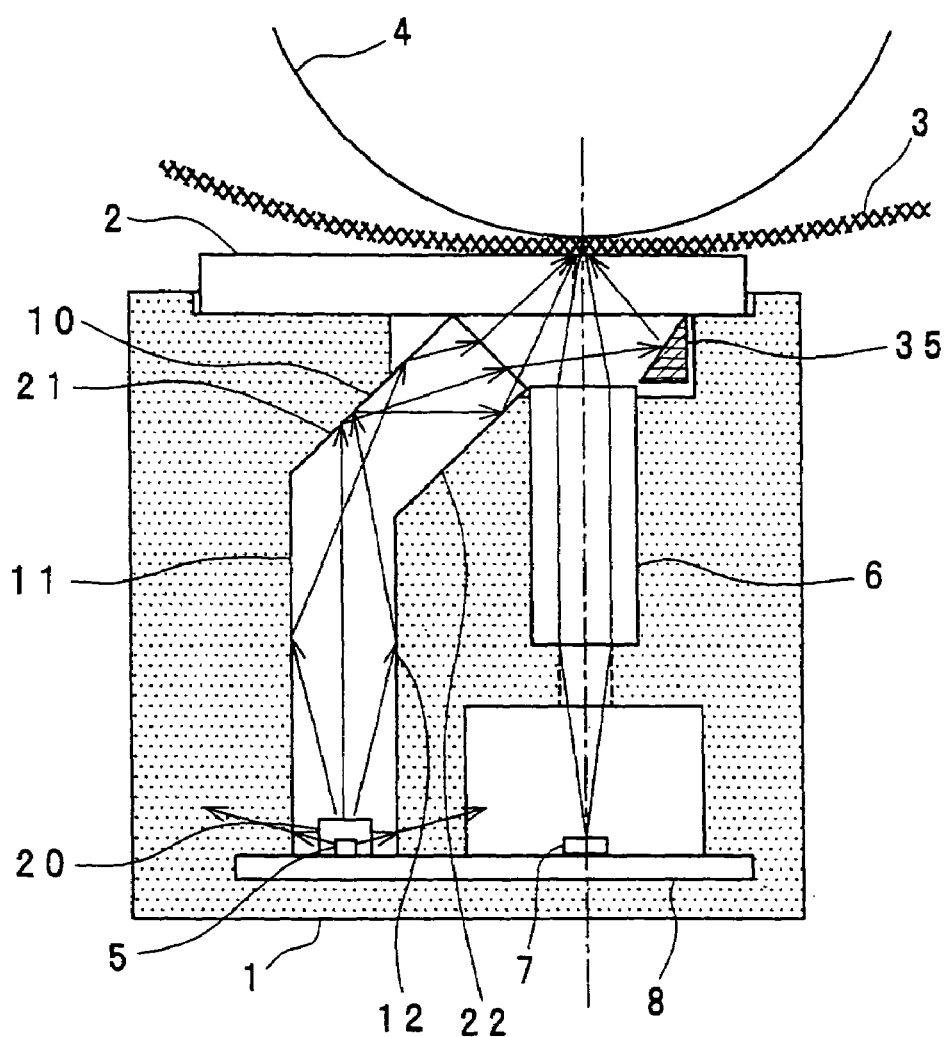
FIG. 11 is a sectional view of a light-guiding means as a comparative example relative to the fifth embodiment.

FIG. 10 shows a sectional view of a light-guiding means (10) to be used in an image-reading apparatus according to the fifth embodiment of the present invention, taken along the shorter axial direction of the light-guiding means (i.e., the sub-scanning direction). FIG. 11 shows a sectional view of a light-guiding means (10) as a comparative example, taken along the shorter axial direction thereof.

As shown in FIG. 11, the light-guiding means (10) is formed having a section in the shape of a simple rectangular parallelopiped (or a part thereof) at and around the substrate (9) having the light source mounted thereon, when taken along the shorter axial direction thereof. Particularly in such a case, when light from the light source (5) enters the light-guiding means (10), parts of the light fluxes which reach the first face (11) and the second face (12) of the light-guiding means (10) have angles smaller than the angles which satisfy the total reflection condition (about 45°), and such light fluxes transmit the light-guiding means (10). In particular, a front mounting type LED radiates light at larger angles, and light from such a LED includes 20 to 50% of light fluxes radiated at angles not smaller than 45°, based on a whole of light fluxes, provided that the front face direction is assumed as 0°.

To solve this problem, the light-guiding means (10) of this embodiment has a fifth face (15) and a sixth face (16) which are formed inclining toward its lower end portion, as shown in FIG. 10. The fifth face (15) and the sixth face (16) reflect light fluxes as much as possible so as to guide such light fluxes to the light outgoing face (18) of the light-guiding means (10). Thus, loss of illuminance, which may occur until the light fluxes reach the surface of the document, is lessened so that the illuminance on the surface of the document can be more improved.

Embodiment 6

Figure 12:
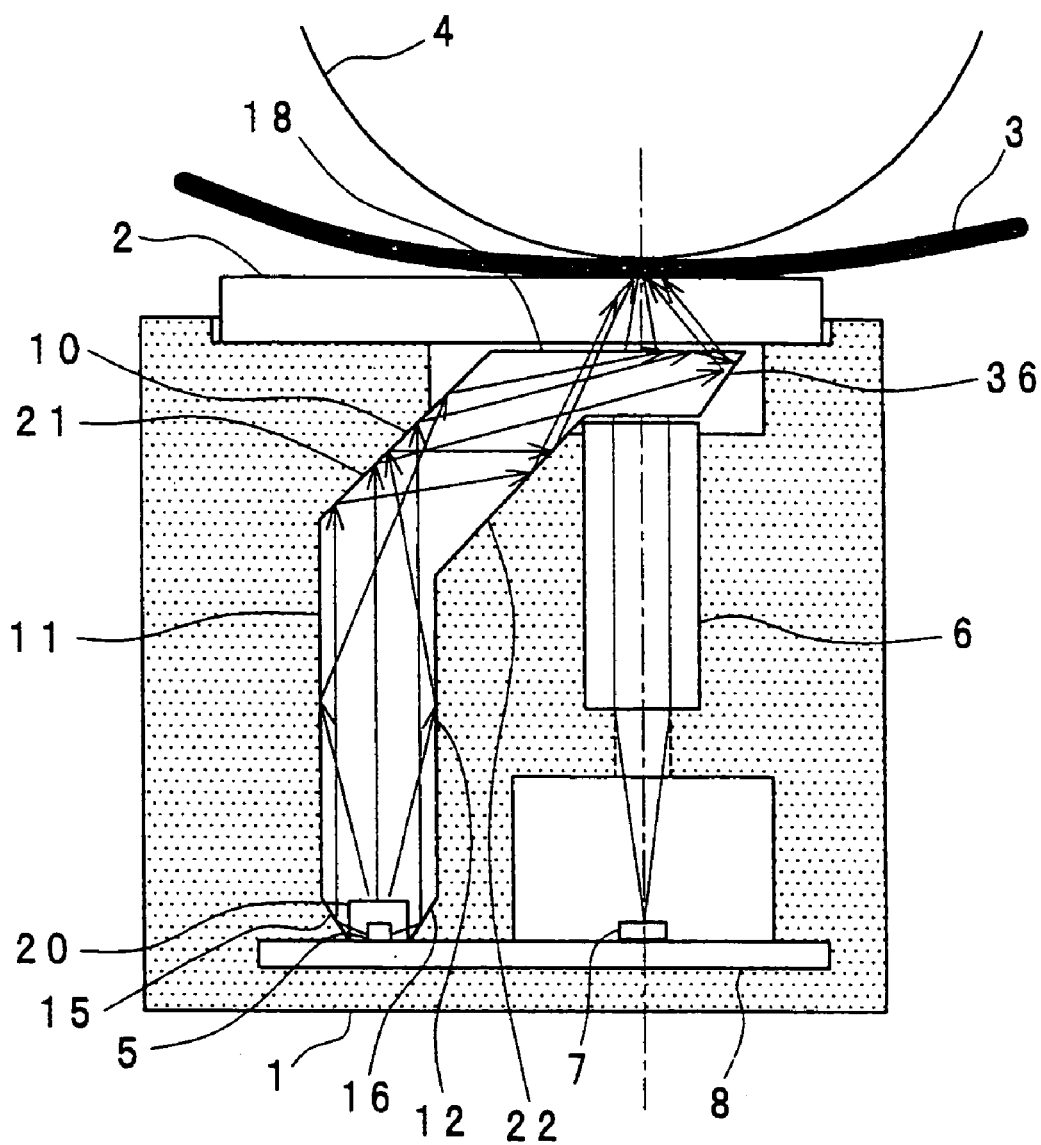
FIG. 12 is a sectional view of a light-guiding means to be used in an image-reading apparatus according to the sixth embodiment of the present invention, taken along the shorter axial direction.

FIG. 12 shows a sectional view of a light-guiding means (10) to be used in an image-reading apparatus according to the sixth embodiment of the present invention, taken along the shorter axial direction thereof. Since the sixth embodiment shown in FIG. 12 is substantially the same one as the third embodiment shown in FIG. 5, the description of the same parts is omitted by denoting them with the like reference numerals.

As seen in FIG. 12, the reflecting section (36) is integrally formed with the light-guiding means (10). Desirably, a reflective mirror coating is provided on the reflecting section (36). Light fluxes radiated from the light source (5) are separated into two groups as follows:

(1) as seen in the section of the light-guiding means in the shorter axial direction, one group of light fluxes reflected on the fifth face (15) and the sixth face (16) and light fluxes reflected on the first face (11) and the second face (12) are further reflected on the ninth face (21) and the tenth face (22), and then transmit the light outgoing face (18) and reach the surface of the document, and (2) the other group of light fluxes which are once reflected on the light outgoing face (18) are reflected on the reflecting section (36), and transmit the light outgoing face (18) and reach the surface of the document. Thus, these two groups of light fluxes (1) and (2) symmetrically illuminate the surface of the document.

Further, since the light-guiding means (10) is formed integrally with the reflecting section (36), it becomes possible to strictly set the positional relationship between the reflecting face (or the light outgoing face (18)) of the light-guiding means (10) and the reflecting section (36). Therefore, fluctuation in illuminance on the surface of the document due to an error in the assembly can be lessened.

Embodiment 7

Figure 13:
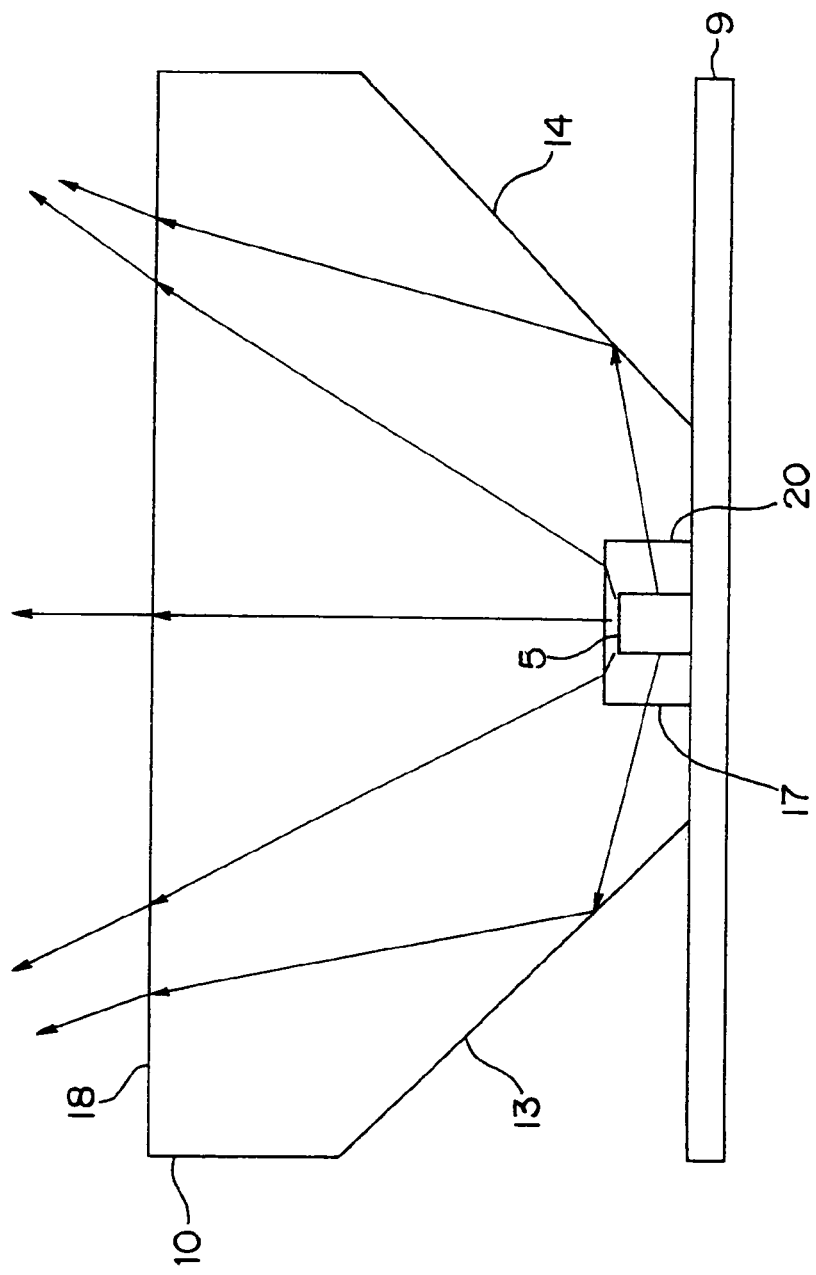
FIG. 13 is a sectional view of a light-guiding means to be used in an image-reading apparatus according to the seventh embodiment of the present invention, taken along the longer axial direction (i.e., the main scanning direction)

FIG. 13 shows a sectional view of a light-guiding means (10) to be used in an image-reading apparatus according to the seventh embodiment of the present invention, taken along the longer axial direction (i.e., the main scanning direction) thereof.

The light source-accommodating section (20) of the light-guiding means (10) of the seventh embodiment has a shape of a rectangular parallelopiped. In this case, the number of light fluxes reflected on the third face (13) and the fourth face (14) of the light-guiding means can be increased by (1) increasing the height of the rectangular parallelopiped, or
(2) decreasing the width of the rectangular parallelopiped.

Thus, the illuminance on the peripheral portion of the surface of the document (3) can be improved.

In the meantime, the number of light fluxes directly radiated to the light outgoing face (18) of the light-guiding means can be increased by (3) decreasing the height of the rectangular parallelopiped, or
(4) increasing the width of the rectangular parallelopiped.

Thus, the illuminance on the center portion of the surface of the document (3) can be improved.

As described above, the illuminance distribution on the surface of the document can be controlled in correspondence to the directive characteristics of the light source (5) by changing the aspect ratio of the rectangular parallelopiped of the light source-accommodating section (20).

Embodiment 8

Figure 14:
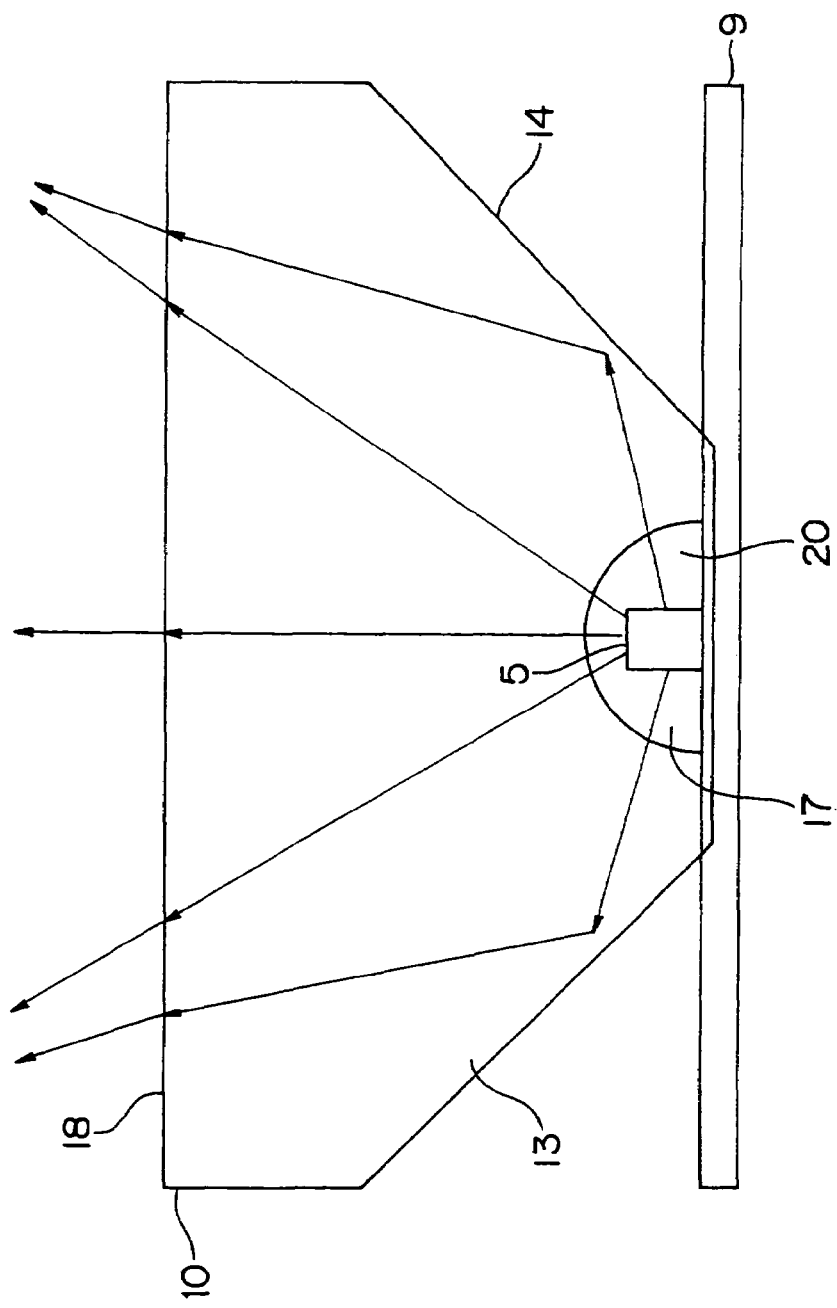
FIG. 14 is a sectional view of a light-guiding means to be used in an image-reading apparatus according to the eighth embodiment of the present invention, taken along the longer axial direction (i.e., the main scanning direction)

FIG. 14 shows a sectional view of a light-guiding means (10) to be used in an image-reading apparatus according to the eighth embodiment of the present invention, taken along the longer axial direction (i.e., the main scanning direction) thereof.

The light source-accommodating section (20) of the light-guiding means (10) of the eighth embodiment is formed in the shape of a (semi)sphere. When the light emitting point is sufficiently small, the light emitting point of the light source (5) is set at the center of the sphere so that all the light fluxes can vertically income to the light incoming face (17). By doing so, the angles of the light fluxes do not change due to refraction, and thus, light beams with isotropic radiation angles can be guided into the light-guiding means (10).

Even if the light-emitting point of the light source (5) is not set at the center of the spherical body, it is possible to control the radiation angles of the light fluxes to be guided into the light-guiding means (10). Therefore, it is possible to uniform the illuminance on the surface of the document (3).

Embodiment 9

Figure 15:
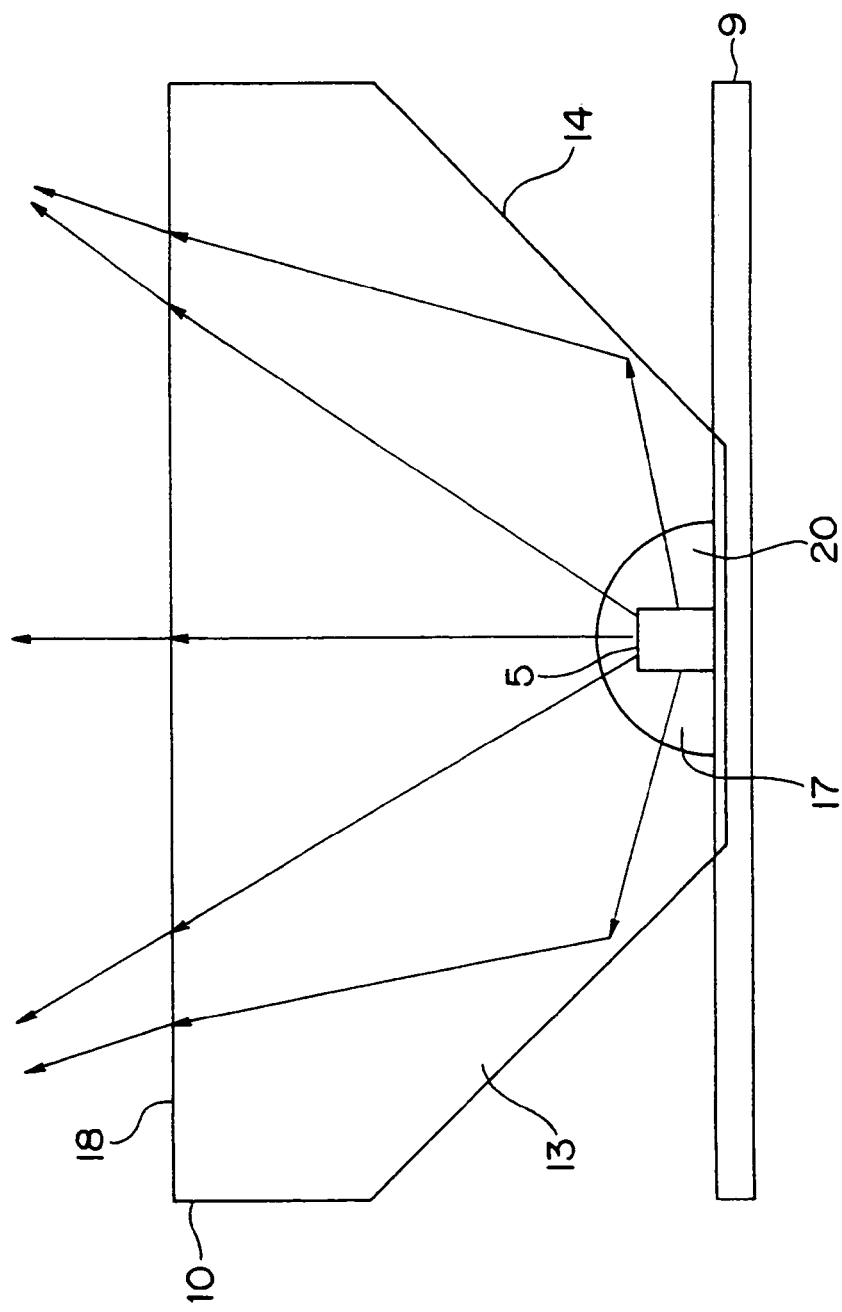
FIG. 15 is a sectional view of a light-guiding means to be used in an image-reading apparatus according to the ninth embodiment of the present invention, taken along the longer axial direction (i.e., the main scanning direction)

FIG. 15 shows a sectional view of a light-guiding means (10) to be used in an image-reading apparatus according to the ninth embodiment of the present invention, taken along the longer axial direction (i.e., the main scanning direction) thereof.

The light source-accommodating section (20) of the light-guiding means (10) of the ninth embodiment is cylindrically formed. By doing so, a similar effect to that of the fourth embodiment can be obtained in the longer axial direction, while an independent effect can be obtained in the shorter axial direction.

Embodiment 10

Figure 16:
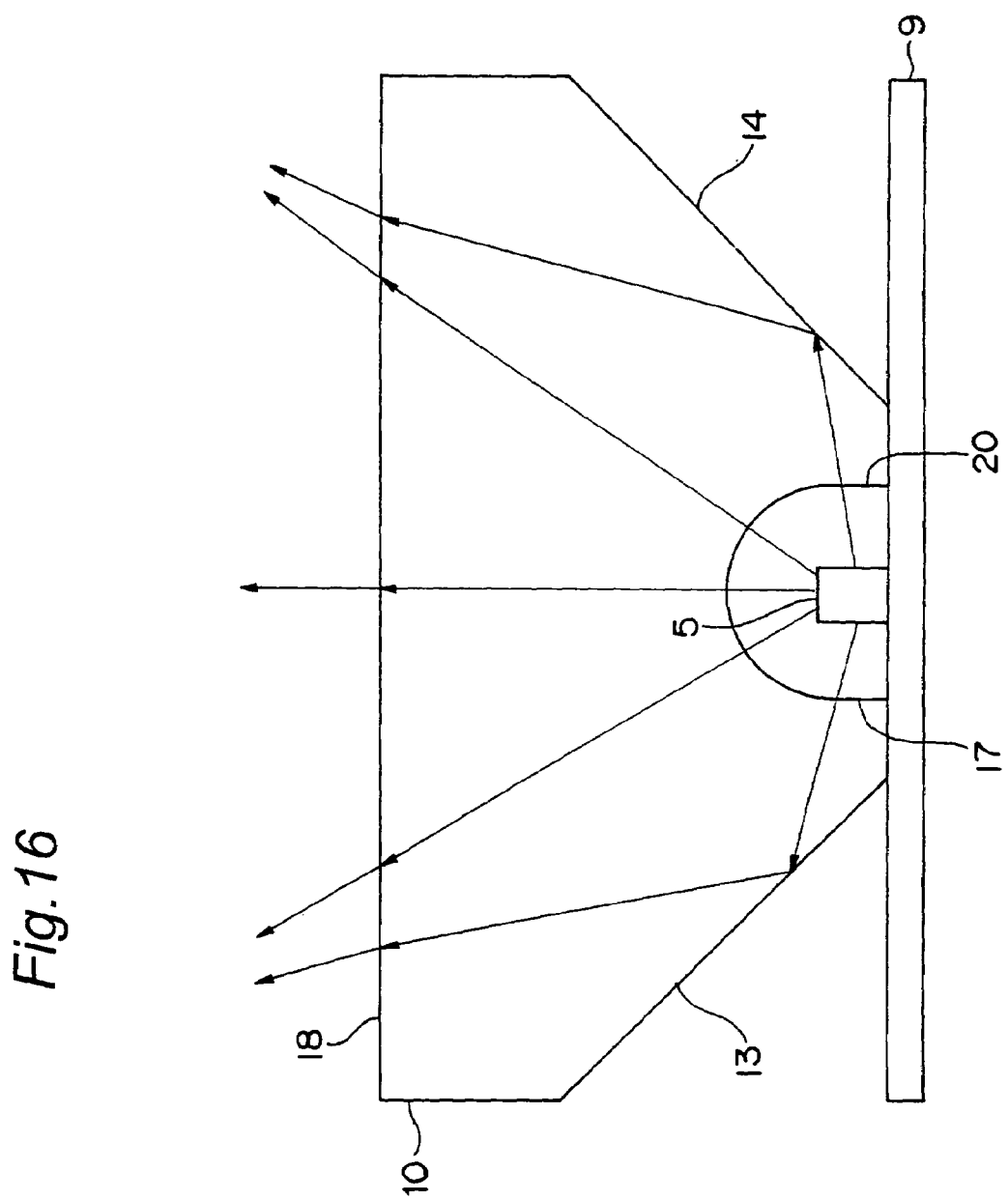
FIG. 16 is a sectional view of a light-guiding means to be used in an image-reading apparatus according to the tenth embodiment of the present invention, taken along the longer axial direction (i.e., the main scanning direction)

FIG. 16 shows a sectional view of a light-guiding means (10) to be used in an image-reading apparatus according to the tenth embodiment of the present invention, taken along the longer axial direction (i.e., the main scanning direction) thereof.

The light source-accommodating section (20) of the light-guiding means (10) of the tenth embodiment has a shape of a cylindrical wall combined with a rectangular parallelopiped in its longitudinal direction.

By doing so, firstly, it is apparent that a similar effect to that of the ninth embodiment can be obtained, and in view of uniformity of illuminance, the number of parameters for optimizing the shape is increased to thereby improve the degree of freedom in designing.

Embodiment 11

Figure 17:
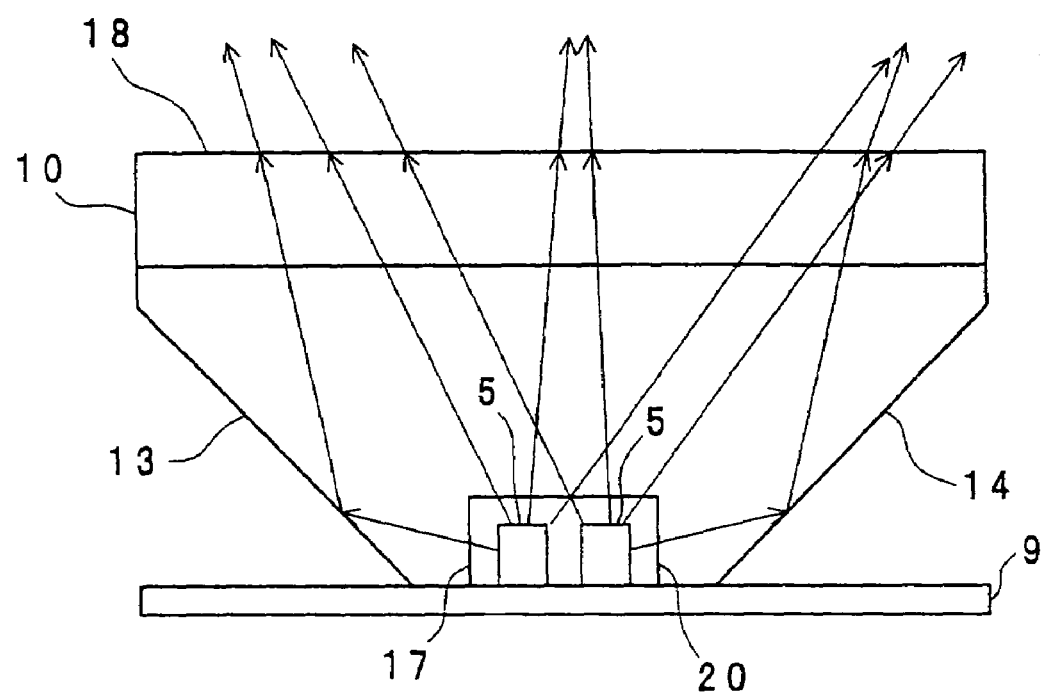
FIG. 17 is a sectional view of a light-guiding means to be used in an image-reading apparatus according to the eleventh embodiment of the present invention, taken along the longer axial direction (i.e., the main scanning direction)

FIG. 17 shows a sectional view of a light-guiding means (10) to be used in an image-reading apparatus according to the eleventh embodiment of the present invention, taken along the longer axial direction (i.e., the main scanning direction) thereof.

In the light-guiding means (10) of the eleventh embodiment, a plurality of light sources (5) are disposed in the light source-accommodating section (20) so that the intensity of the illumination can be improved. Further, since the illumination can be intensified, the reading speed can be improved.

Embodiment 12

Figure 18:
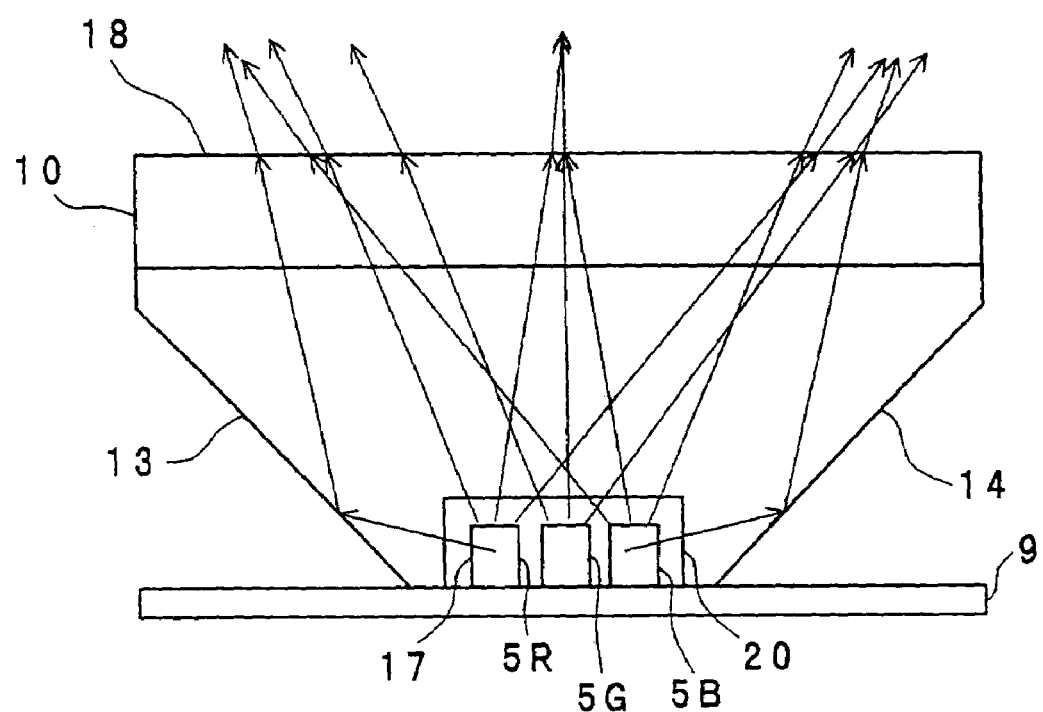
FIG. 18 is a sectional view of a light-guiding means to be used in an image-reading apparatus according to the twelfth embodiment of the present invention, taken along the longer axial direction (i.e., the main scanning direction)

FIG. 18 shows a sectional view of a light-guiding means (10) to be used in an image-reading apparatus according to the twelfth embodiment of the present invention, taken along the longer axial direction (i.e., the main scanning direction) thereof.

In the light-guiding means (10) of the twelfth embodiment, light sources of red light, green light and blue light (5R, 5G and 5B) are disposed in the light source-accommodating section (20). By doing so, the three primary color lights from the independent light sources can be synthesized in the same light-guiding means (10).

In addition to the light sources of three primary color lights, a fourth light source which emits infrared rays may be provided to the twelfth embodiment.

Embodiment 13

FIG. 19(1) shows a sectional view of a light-guiding means (10) to be used in an image-reading apparatus according to the thirteenth embodiment of the present invention, taken along the longer axial direction (i.e., the main scanning direction) thereof.

In the light-guiding means (10) of the thirteenth embodiment, light sources of red light, green light and blue light are disposed in the light source-accommodating section (20). The shape of the light incoming face (18) of the light source-accommodating section (20) is formed by combining a plurality of cylindrical walls so that their interfaces can be positioned on the optical axes of the respective light sources (5) which direct toward the light outgoing front face of the light-guiding means.

In this connection, when only one light source (5) of white light is disposed, it is elucidated from the experiments that the uniformity of illuminance can be highly improved by shaping the light source-accommodating section (20) as follows: as shown in FIG. 19(2), the shape of the light source-accommodating section (20) is formed by combining two cylindrical walls so that the interface of the two cylindrical walls can be positioned on the optical axis of the light source which directs toward the light outgoing front face of the light-guiding means. The thirteenth embodiment is provided by applying this result to three light sources of three primary color lights.

With the above arrangement, the uniformity of the illuminance on the surface of the document can be further improved.

Embodiment 14

Figure 20:
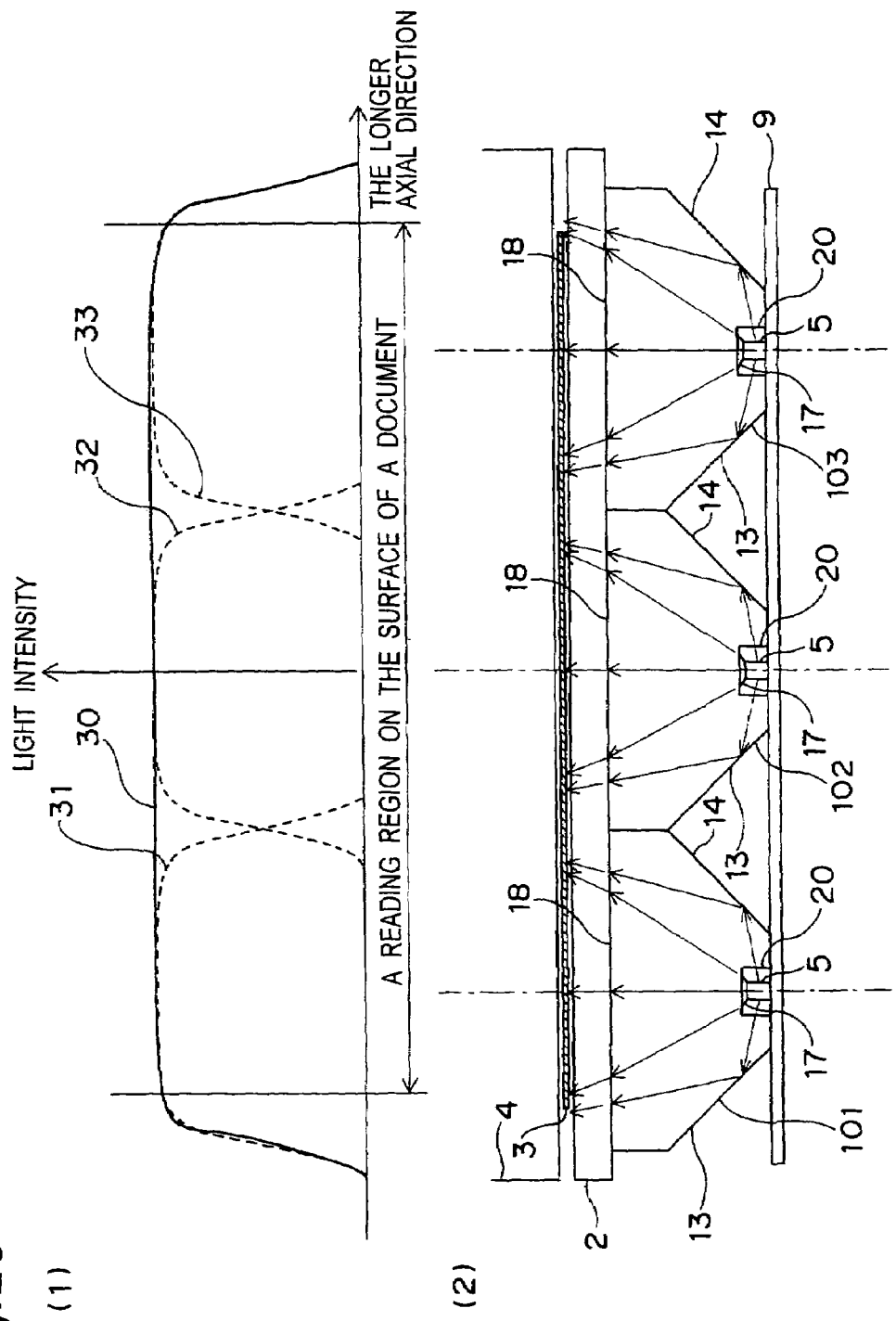
FIG. 20 consists of FIGS. 20(1) and 20(2), wherein FIG. 20(1) shows the light intensity distribution in the longer axial direction of the reading region of a document, obtained by an image-reading apparatus according to the fourteenth embodiment of the present invention, and FIG. 20(2) is a sectional view of a light-guiding means to be used in the image-reading apparatus according to the fourteenth embodiment, taken along the longer axial direction (i.e., the main scanning direction)

FIG. 20(2) shows a sectional view of a light-guiding section to be used in an image-reading apparatus according to the fourteenth embodiment of the present invention, taken along the longer axial direction (i.e., the main scanning direction) thereof.

The light-guiding section of the fourteenth embodiment shown in FIG. 20(2) is provided by combining a plurality of the light-guiding means (10) (101, 102 and 103) according to any of the first embodiment to the thirteenth embodiment along the longer axial direction. The purpose of combining the plurality of the light-guiding means is to equal the intensity of the illumination to the surface of the document from the joint between each of the individual light-guiding means and its peripheral portion, to the intensity of the illumination thereto from other sites of the light-guiding means in the longer axial direction (see FIG. 20(1)).

In particular, the intensity of the illumination by one light-guiding means (10) and one light source (5) becomes lower, as the site of the document relative to the light source (5) is far and far from the light source (5) in the longer axial direction (see FIG. 8). To solve this problem, a plurality of light-guiding means as constitutive units are combined so that the intensities of the illumination on the sites of the document corresponding to the joints of the light-guiding means in the longer axial direction can not be lowered, as shown in FIG. 20(1). By doing so, the length of the reading region of the document can be increased, which makes it possible to read a document with a larger size. In this regard, the joint faces of the light-guiding means (10) are bonded with transparent adhesive, or such faces are kept having mirror faces to thereby suppress a change in the intensity of the illumination due to diffusion. Thus, the uniformity of the intensities of the illumination at the joints of the light-guiding means can be ensured. If the joint faces of the light-guiding means are granular or uneven, the illuminance distribution on the surface of the document corresponding to such joint faces or their peripheral portions may not be uniform.

When a relatively long document is read, the light-guiding means hitherto has been lengthened, exceeding the width of the document. However, this method has limits in the number of light sources used and in the illuminance thereof, even though the reading region can be increased. Therefore, it is difficult to obtain sufficient illuminance.

According to this embodiment, a plurality of the light-guiding means (as constitutive units) integrated with the light sources can be disposed in accordance with the length of the reading region of the document. By doing so, the illuminance on the surface of the document can be substantially kept constant in the longer axial direction. Thus, there is no difficulty in reading of a relatively long document.

For example, when ten light-guiding means with lengths of 30 mm in the longer axial direction are disposed, uniform illumination onto a reading region with a length of 300 mm becomes possible. In other words, reading of a document with A3 size becomes possible.

Embodiment 15

Figure 21:
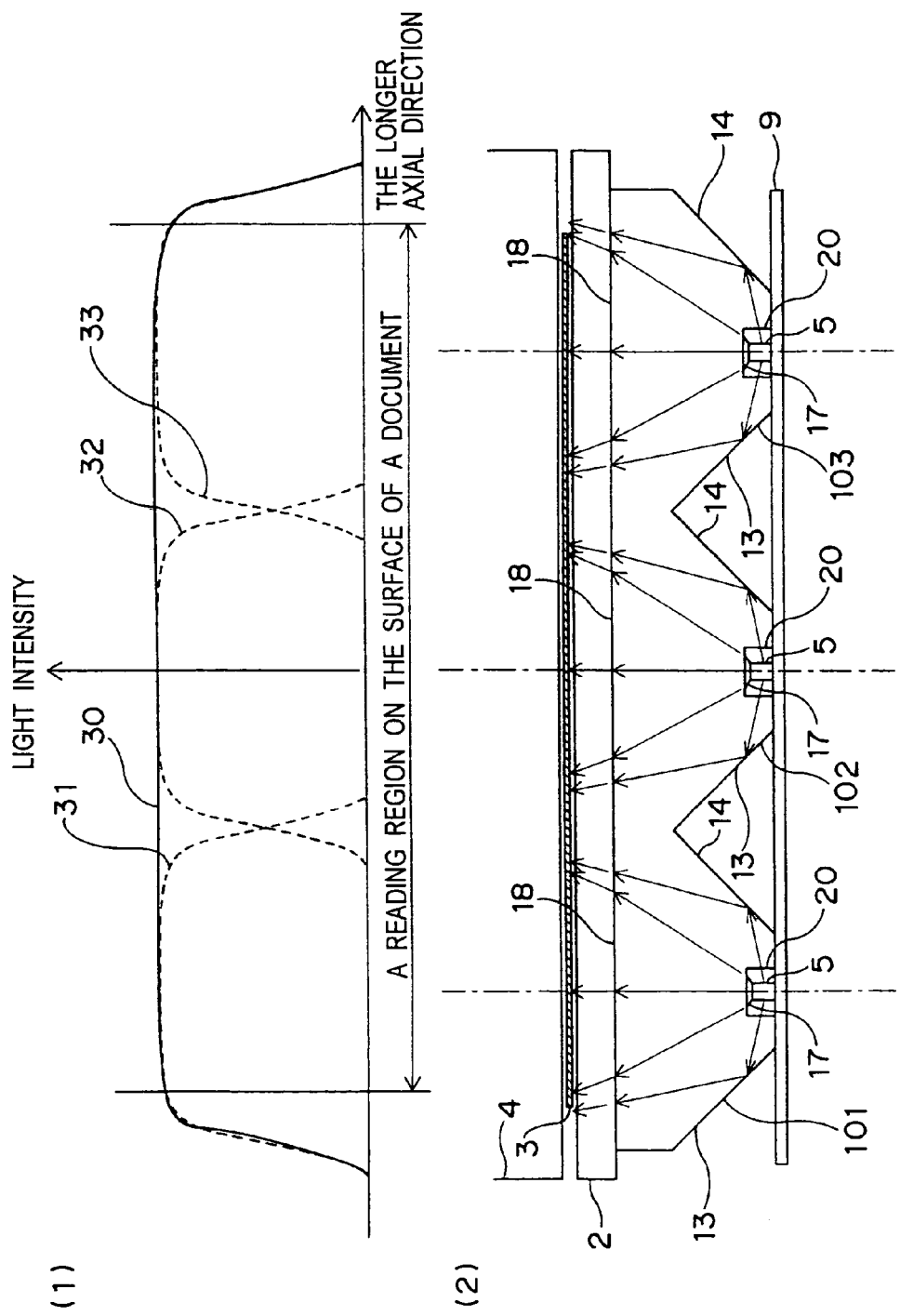
FIG. 21 consists of FIGS. 21(1) and 21(2), wherein FIG. 21(1) shows the light intensity distribution in the longer axial direction of the reading region of a document, obtained by an image-reading apparatus according to the fifteenth embodiment of the present invention, and FIG. 21(2) is a sectional view of a light-guiding means to be used in the image-reading apparatus according to the fifteenth embodiment, taken along the longer axial direction (i.e., the main scanning direction)

FIG. 21(2) shows a sectional view of a light-guiding member to be used in an image-reading apparatus according to the fifteenth embodiment of the present invention, taken along the longer axial direction (i.e., the main scanning direction) thereof.

In the fifteenth embodiment, the light-guiding member equivalent to a plurality of light-guiding means is formed by integral molding, while, in the fourteenth embodiment, a plurality of separate light-guiding means (10) are combined. By doing so, the number of the components of the image-reading apparatus can be decreased, and the accuracy of the assembly can be improved.

In case where a very large document is read, a plurality of the light-guiding members as described above may be combined.

FIG. 23 shows an example of simulation of traces of light beams which are found when the light-guiding means (10) according to the fifteenth embodiment is used. It is well known from this graph that no polarization is found in the illumination angle to the surface of the document.

Figure 24:
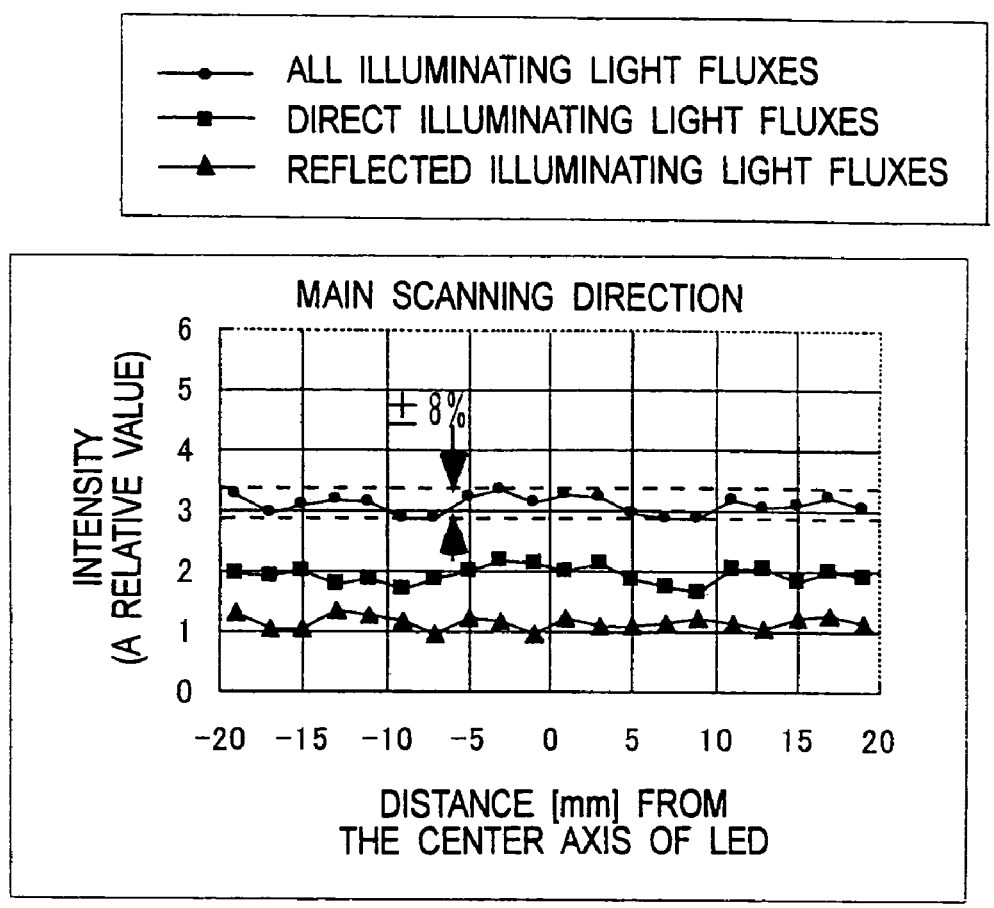
FIG. 24 is a graph showing the results of calculation of the illuminance distribution on the surface of the document, obtained by the light-guiding means according to the fifteenth embodiment.

FIG. 24 shows the results of the calculation of the illuminance distribution on the surface of the document in the above case. This calculation is made under the following conditions: the length of the light-guiding means (10) in the main scanning direction is assumed to be 32 mm, and three light-guiding means as above are integrally formed; and the illuminance on a reading position at the center portion of the document in the main scanning direction is calculated. The illuminance of the reflected illuminating light flux is ½ or more of the illuminance of the direct illuminating light flux, and the illuminance distribution of all the light fluxes is within a range of ±10%.

Figure 25:
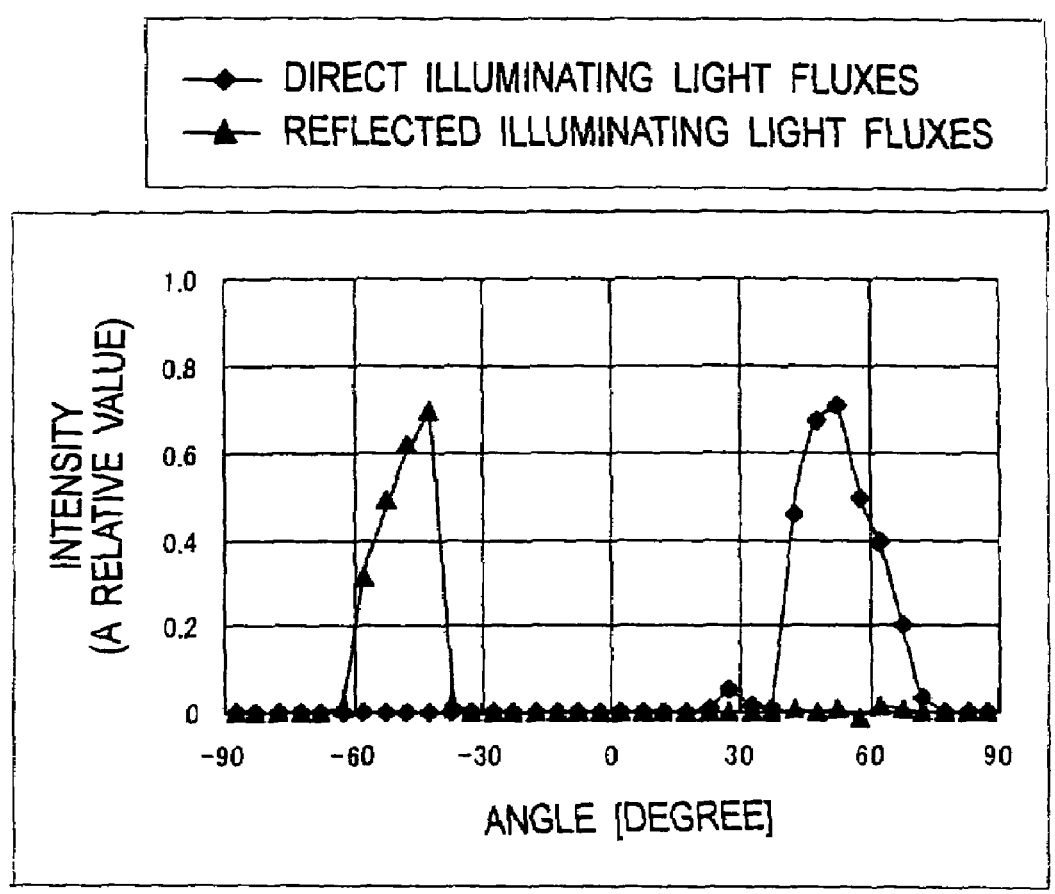
FIG. 25 is a graph showing the results of calculation of the illuminating angle distribution of light fluxes which illuminate the surface of the document, found at a reading position on the surface of the document, in case where the light-guiding means according to the fifteenth embodiment is used.

FIG. 25 shows the results of the calculation of the illumination angle distribution of the illuminating light fluxes, at the reading position on the surface of the document. The illumination angles of the direct illuminating light fluxes are from +37° to +72°, and the illumination angles of the reflected illuminating light fluxes are from −37° to −63°, from which it is known that both the light fluxes have a substantially symmetric relationship.

What is claimed is:

1. An image-reading apparatus comprising
at least one light source configured to illuminate a surface of a document with light;
a light-guiding mechanism including a light incoming face and a light outgoing face, the light-guiding mechanism configured to allow light emitted from said light source to travel in the light-guiding mechanism and guide the light to a linear objective reading region;
an optical system configured to collect light reflected on the surface of said document; and
a reading sensor configured to read an image of the document, wherein
said light-guiding mechanism includes, at its top face, said light outgoing face in a shape of a substantially rectangular parallelopiped which extends in a longer axial direction of said linear objective reading region, and includes, at its base, a light source-accommodating section in which said light source is disposed, a wall of said light source-accommodating section serving as said light incoming face;
a first wall and a second wall of said light-guiding mechanism serve as a first face and a second face and are formed to extend parallel to the longer axial direction of said light-guiding mechanism, and a third side wall and a fourth side wall of said light-guiding mechanism serve as a seventh face and an eighth face and are formed to extend perpendicular to the longer axial direction of said light-guiding mechanism;
in the shorter axial direction of said linear objective reading region of said document, light fluxes, which are emitted from said light source and pass through said light source-accommodating section and enter the light incoming face of said light-guiding mechanism, are reflected on said first face and said second face so as to be guided to said light outgoing face and to said linear objective reading region, and
said light guiding mechanism further includes a reflecting face configured to reflect a part of the light fluxes from said light outgoing face of said light-guiding mechanism onto the surface of the document, so as to guide said part of the light fluxes to said linear objective reading region.

2. The image-reading apparatus according to claim 1, wherein
the first face and the second face of said light-guiding mechanism are bent to form a ninth face and a tenth face, respectively, and of light fluxes outgoing from the light outgoing face of said light-guiding mechanism, a quantity of the light fluxes directly guided to said linear objective reading region and the quantity of the light fluxes reflected on said reflecting face and then guided to said linear objective reading region is substantially equal.

3. The image-reading apparatus according to claim 2, wherein:
said light source and said reading sensor are disposed on a same substrate.

4. The image-reading apparatus according to claim 3, wherein:
said light-guiding mechanism includes a third face and a fourth face formed spreading from around the light source-accommodating section on the base of the light-guiding mechanism toward the seventh face and the eighth face, and extending in parallel to the shorter axial direction of said light-guiding mechanism, and wherein, in the longer axial direction of said linear objective reading region of the document, out of light fluxes emitted from said light source and which pass through the light source-accommodating section and enter the light incoming face of said light-guiding mechanism, most of the light fluxes having angles totally reflected on the light outgoing face of said light-guiding mechanism are reflected on said third face and said fourth face and guided to the light outgoing face.

5. The image-reading apparatus according to claim 4, wherein:
said first face and said second face of said light-guiding mechanism are provided with a fifth face and a sixth face, respectively, which are configured to reflect most light fluxes with angles not totally reflected on the first face and the second face, out of light fluxes emitted from said light source and pass through the light source-accommodating section and income to the light incoming face of said light-guiding mechanism, to guide said light fluxes to said light outgoing face.

6. The image-reading apparatus according to claim 5, wherein:
a space between the light outgoing face and the reflecting face of said light-guiding mechanism is filled with a transparent material to form a second reflecting face on the surface of the transparent material, and thereby, said transparent material and said light-guiding mechanism are integrally formed.

7. The image-reading apparatus according to claim 5, wherein:
the shape of the wall of said light source-accommodating section of said light-guiding mechanism is a rectangular parallelopiped.

8. The image-reading apparatus according to claim 5, wherein:
the shape of the wall of said light source-accommodating section of said light-guiding mechanism is a semi-sphere.

9. The image-reading apparatus according to claim 5, wherein:
the shape of the wall of said light source-accommodating section of said light-guiding mechanism is cylindrical.

10. The image-reading apparatus according to claim 5, wherein:
the shape of the wall of said light source-accommodating section of said light-guiding mechanism is formed by combining a rectangular parallelopiped with a cylindrical wall.

11. The image-reading apparatus according to claim 5, wherein:
a plurality of light sources are disposed as said light source in said light source-accommodating section of said light-guiding mechanism.

12. The image-reading apparatus according to claim 5, wherein:
light sources configured to emit at least red light, green light and blue light are disposed as said light source in said light source-accommodating section of said light-guiding mechanism.

13. The image-reading apparatus according to claim 5, wherein:
a plurality of light sources are disposed along the longer axial direction, as said light source in said light source-accommodating section of said light-guiding mechanism, and said light incoming face is formed in the shape of combined cylindrical walls, each of which corresponds to each of said light sources.

14. The image-reading apparatus according to claim 5, wherein:

a plurality of said light-guiding mechanisms are combined along the longer axial direction.

15. The image-reading apparatus according to claim 5, wherein:

a plurality of said light-guiding mechanisms are integrally formed to correspond to a whole or a part of the reading region.

* * * * *